(12) United States Patent
Irwin

(10) Patent No.: US 7,694,934 B2
(45) Date of Patent: Apr. 13, 2010

(54) DIAPHRAGM VALVE FOR IRRIGATION SYSTEMS

(75) Inventor: Kevin M. Irwin, Tucson, AZ (US)

(73) Assignee: Rain Bird Corporation, Azusa, CA (US)

( * ) Notice: Subject to any disclaimer, the term of this patent is extended or adjusted under 35 U.S.C. 154(b) by 479 days.

(21) Appl. No.: 11/462,407

(22) Filed: Aug. 4, 2006

(65) Prior Publication Data

US 2008/0029722 A1 Feb. 7, 2008

(51) Int. Cl.
*F16K 31/12* (2006.01)
(52) U.S. Cl. .................. 251/30.02; 251/30.01; 251/45; 137/242
(58) Field of Classification Search ............. 251/30.01, 251/30.02, 33, 45, 331, 333, 123, 125; 137/550, 137/599.01; 210/107, 335
See application file for complete search history.

(56) References Cited

U.S. PATENT DOCUMENTS

| | | | |
|---|---|---|---|
| 969,364 A * | 9/1910 | Grootenhuis | 210/354 |
| 1,033,745 A * | 7/1912 | Smith | 210/107 |
| 1,741,444 A * | 12/1929 | Slider et al. | 210/355 |
| 2,114,789 A * | 4/1938 | Urquhart | 251/175 |
| 2,255,404 A * | 9/1941 | White et al. | 137/516.25 |
| 2,934,307 A | 4/1960 | Henderson | |
| 3,022,039 A | 2/1962 | Cone et al. | |
| 3,785,391 A | 1/1974 | Miller | |
| 3,942,842 A * | 3/1976 | Young, Jr. | 406/53 |
| 4,081,171 A * | 3/1978 | Morgan et al. | 251/30.02 |
| 4,135,696 A | 1/1979 | Saarem et al. | |
| 4,180,236 A | 12/1979 | Saarem et al. | |
| 4,221,361 A | 9/1980 | Weingarten | |
| 4,235,414 A | 11/1980 | Lis | |
| 4,360,037 A * | 11/1982 | Kendall | 137/242 |
| 4,505,450 A | 3/1985 | Saarem et al. | |
| 4,506,860 A * | 3/1985 | von Schwerdtner et al. | 251/124 |
| 4,508,136 A | 4/1985 | Kah, Jr. | |
| 4,671,485 A | 6/1987 | Saarem | |

(Continued)

FOREIGN PATENT DOCUMENTS

GB 1275221 5/1972

(Continued)

OTHER PUBLICATIONS

"252 Series Plastic Valves" Sell Sheet, The Toro Company, Feb. 2003.
Photos of "252 Series Plastic Valve" parts.

*Primary Examiner*—John K Fristoe, Jr.
*Assistant Examiner*—Marina Tietjen
(74) *Attorney, Agent, or Firm*—Fitch, Even, Tabin & Flannery

(57) ABSTRACT

A diaphragm valve is disclosed that is adapted to reduce debris in the flow paths, reduce the water hammer effect, reduce the energy lost during flow, and/or improve bleed operation. The diaphragm valve includes at least two seals that are configured to permit multi-stage sealing of an opening in a diaphragm valve seat. The initial sealing stage blocks some but not all fluid flow through the opening, and the final sealing stage blocks fluid flow through the opening. The use of two sealing stages can reduce the water hammer effect by increasing the time over which sealing occurs.

13 Claims, 16 Drawing Sheets

U.S. PATENT DOCUMENTS

| | | | | |
|---|---|---|---|---|
| 5,020,568 A | * | 6/1991 | Taylor | 137/316 |
| 5,688,402 A | * | 11/1997 | Green et al. | 210/355 |
| 5,979,482 A | | 11/1999 | Scott | |
| 5,996,608 A | | 12/1999 | Hunter et al. | |
| 6,000,674 A | * | 12/1999 | Cheng | 251/26 |
| 6,079,437 A | | 6/2000 | Beutler et al. | |
| 6,263,901 B1 | | 7/2001 | Lohde et al. | |
| 6,394,126 B2 | | 5/2002 | Lohde et al. | |
| 6,394,413 B2 | | 5/2002 | Lohde et al. | |
| 6,557,580 B2 | | 5/2003 | Lohde et al. | |
| 6,666,433 B1 | * | 12/2003 | Pierce | 251/359 |
| 6,848,632 B2 | | 2/2005 | Clark | |
| 6,877,714 B2 | | 4/2005 | Hall | |
| 7,351,269 B2 | * | 4/2008 | Yau | 55/297 |
| 2002/0145123 A1 | * | 10/2002 | Kah et al. | 251/30.01 |

FOREIGN PATENT DOCUMENTS

| | | |
|---|---|---|
| JP | 1224585 | 9/1989 |
| JP | 9291521 | 11/1997 |

\* cited by examiner

1

DIAPHRAGM VALVE FOR IRRIGATION SYSTEMS

FIELD

The disclosure is directed to a diaphragm valve for irrigation systems, and in particular to a diaphragm valve configured for improved flow.

BACKGROUND

Diaphragm valves for use in irrigation systems typically have an inlet opening, an exit opening and a diaphragm element having a seal positioned to selectively open and close against a generally cylindrical diaphragm seat to permit or block fluid flow through an opening of the diaphragm seat and thus from the inlet opening to the outlet opening. A control chamber is positioned on the opposite side of the diaphragm element from the seat to control the position of the seal of the diaphragm element. When the fluid pressure acting on the diaphragm element from the control chamber side exceeds the fluid pressure acting on the opposite side of the diaphragm element, the diaphragm element will be forced against the diaphragm seat to block fluid flow through the opening of the seat and thereby block fluid flow from the inlet opening to the outlet opening. Conversely, when the fluid pressure acting on the diaphragm element from the control chamber side is less than the fluid pressure acting on the opposite side of the diaphragm element, the diaphragm element will be forced away from the diaphragm seat to permit fluid flow through the opening of the seat and thereby permit fluid flow from the inlet opening to the outlet opening.

The seal of the diaphragm element often engages an annular face of the diaphragm seat when the diaphragm element is in its closed position to block fluid flow through the opening of the seat. Examples of such engagement between the seal and the face of the diaphragm seat are disclosed in U.S. Pat. Nos. 6,877,714 and 6,557,580. As the diaphragm element moves from its open position to its closed position, the flow area between the diaphragm seat and the seal continually decreases in correspondence with the position of the seal from the diaphragm seat until the seal is engaged with the diaphragm seat to block flow through the opening of the diaphragm seat. When the seal engages the diaphragm seat to block flow through the opening of the diaphragm seat, the abrupt change in the flow area between the seal and the diaphragm seat from greater than zero, immediately prior to engagement, and zero, at the time of engagement, can cause a sudden pressure spike greater than the upstream pressure. More specifically, the pressure spike in the upstream pressure can be caused as the motion energy in the flowing fluid is abruptly converted to pressure energy acting on the components of the diaphragm valve. This pressure spike can cause the diaphragm valve experience a water hammer effect, which can undesirably result in increased stress on the components of the diaphragm valve, as well as other components of the irrigation system, and can lead to premature failure of the components.

In order to control the pressure in the control chamber, a fluid entrance path and a fluid exit path to and from the control chamber are typically provided. The fluid entrance path may extend between the inlet opening and the control chamber, and may be continuously supplied with fluid from the inlet opening. The fluid exit path may extend between the control chamber and the outlet opening. A selectively actuatable control valve may be positioned to block fluid flow through the fluid exit path.

When the control valve is positioned to block fluid flow through the fluid exit path from the control chamber, the fluid entrance path continues to permit fluid to flow from the inlet opening to the control chamber, thereby causing fluid to accumulate in the control chamber. The diaphragm element has a larger surface area on the control chamber side than on the side facing the inlet opening. Thus, when the fluid pressure in the control chamber and inlet opening are generally the same, the operation of the fluid pressure in the control chamber acts on the greater surface area of the control chamber side of the diaphragm element and causes the diaphragm element to either shift from its open position to its closed position or to remain in its closed position.

When the control valve is positioned to permit fluid flow through the fluid exit path from the control chamber, fluid exits the control chamber at a faster rate than fluid enters the control chamber. This causes the fluid pressure acting on the control chamber side of the diaphragm element to decrease relative to the fluid pressure acting on the side of the diaphragm element facing the inlet opening. The fluid pressure in the inlet opening then causes the diaphragm element to move to its open position, whereby the seal of the diaphragm element is spaced from the diaphragm seat and fluid flow is permitted from the inlet opening, through the opening of the diaphragm seat and through the exit opening.

Dirt, grit and other debris are typically present in an irrigation system. The debris can have a detrimental effect on the operation of the diaphragm valve, particularly when the debris accumulates on various components within the diaphragm valve. For instance, debris can accumulate on the seal of the diaphragm element, and reduce the seal that can be achieved between the seal and the diaphragm seat. In some circumstances, the abrasive effect of the debris can degrade the seal. Debris can also clog the fluid entrance and fluid exit paths of the control chamber, which can result in improper operation of the diaphragm element and thus can lead to difficulties in opening and closing of the valve.

In order to reduce the presence of debris in the diaphragm valve, it has been known to position a cylindrical screen between the inlet opening and the control chamber of the diaphragm valve, as disclosed in U.S. Pat. No. 5,996,608. The '608 patent also discloses the use of a wiper that extends around the circumference of the cylindrical screen and is mounted for longitudinal reciprocation along the screen when the diaphragm valve is shifted between its open and closed positions to reduce accumulation of debris, and potential clogging, on the screen. The '608 patent further discloses a modified wiper element that is configured to spin freely around the filter screen. However, a freely spinning wiper element can disadvantageously harm the screen when the wiper element is rotating at high speeds due to the frictional contact therebetween. High speeds of the wiper element relative to the screen can occur, for example, during winterization when compressed air is blown through the system to flush out water. The high frictional contact between a freely spinning wiper element and the screen could generate sufficient heat to deform the screen and/or the wiper element.

During operation of the diaphragm valve, air can become trapped in the control chamber. The presence of excess air, a compressible fluid, in the control chamber can adversely effect the operation of the diaphragm valve, and in particular the shifting of the diaphragm element between its open and closed positions. For example, excess air in the control chamber can cause the diaphragm element to shift from its open position to its closed position more rapidly than intended, which can further exacerbate the water hammer effect discussed above. In order to permit for air to be removed from the control chamber, diaphragm valves have been provided with manually-operated bleed mechanisms that allow for a user to selectively vent air from the control chamber. However, when venting air from the control chamber, fluid is often expelled with the air. Depending upon the position of the passage through which the fluid and air is bled from the control chamber, an operator of the valve can be sprayed with fluid in the stream of air exiting the control chamber. For example, U.S. Pat. No. 6,079,437 discloses a control stem that is manually depressed to vent air from the control chamber. As shown in FIG. 2 of the '437 patent, an operator can be sprayed with fluid if present in the vented air, depending upon the position of the operator. The Toro Company, Minneapolis, Minn., has a valve with model no. 252-2506 that incorporates a bleed screw arrangement with a configuration that directs bled fluid from away from a user. However, the bleed screw arrangement of this valve does not sufficiently reduce the velocity of fluid exiting the control chamber, which can in some instances lead to undesirable spray.

The flow path that the fluid follows when the diaphragm valve is in its open position is generally from the inlet opening, past the opening of the diaphragm seat, and finally through the outlet opening. As the fluid follows this path, typical internal geometry of the diaphragm valve can cause very rapid acceleration and deceleration of the fluid. In particular, the geometry of the diaphragm seat can cause acceleration of the fluid as it approaches the opening of the diaphragm seat from the inlet opening. This can be due to the larger flow area of the inlet opening as compared to the flow area of the opening of the diaphragm seat, which can cause the fluid to rapidly accelerate as it approaches the opening in order to maintain incompressible fluid flow. Moreover, the geometry of the diaphragm seat can cause deceleration of the fluid at it exits the opening of the diaphragm seat and enters the outlet opening due to the smaller flow area of the opening of the diaphragm seat as compared to the larger flow area of the adjacent portion of the outlet opening. Rapid deceleration of the flow can cause the loss of energy in the fluid, which results in a pressure loss in the diaphragm valve.

In view of the foregoing deficiencies in existing diaphragm valves, there remains an unmet need for diaphragm valves having improved flow, including diaphragm valves configured to reduce debris in the flow paths, reduce the water hammer effect, reduce the energy lost during flow, and/or improve bleed operation.

SUMMARY

A diaphragm valve is disclosed that addresses the deficiencies with existing diaphragm valves, and is adapted to reduce debris in the flow paths, reduce the water hammer effect, reduce the energy lost during flow, and improve bleed operation.

The diaphragm valve has an inlet passage and an outlet passage connected by an opening in a diaphragm valve seat. The opening in the diaphragm valve seat can be selectively blocked by first and second seals to prevent fluid flow from the inlet passage to the outlet passage when the diaphragm valve is in the closed position. When the diaphragm valve is in the open position, the first and second seals are spaced from the diaphragm valve seat to permit fluid flow through the opening thereof.

A control chamber is provided on an opposite side of a diaphragm element from the diaphragm valve seat to control the position of the first and second seals relative to the diaphragm valve seat. The control chamber is supplied with fluid from the inlet passage through a control chamber fluid path. A solenoid valve selectively blocks an exit passage between the control chamber and the outlet opening of the diaphragm valve. When the solenoid valve is closed to block fluid from exiting the control chamber, the pressure in the control chamber is greater than the pressure acting on the diaphragm element on the opposite side thereof, which causes the first and second seals to engage the diaphragm valve seat to block fluid flow through the opening thereof and thereby prevent fluid flow between the inlet opening and the outlet opening. Conversely, when the solenoid valve is open fluid is permitted to drain from the control chamber into the outlet passage, thereby reducing the pressure in the control chamber acting on the diaphragm element compared to the pressure acting on the opposite side of the diaphragm element. This pressure imbalance causes the diaphragm element to move away from the diaphragm valve seat, bringing with it the first and second seals, in order to permit fluid flow through the opening of the diaphragm valve seat and thus between the inlet and outlet passages of the diaphragm valve.

The reduction of debris is achieved in two flow paths, the flow path between the inlet passage and the control chamber and the flow path between the inlet passage and the outlet passage. In order to reduce debris in the flow path between the inlet passage and the control chamber, a screen is provided in the flow path. To remove debris that may accumulate and potentially block the flow through the screen, a rotatable scrubber is positioned adjacent the screen. During fluid flow between the inlet and outlet passages, the rotatable scrubber rotates against the screen to remove any accumulated debris. A brake is provided to limit the acceleration of the rotatable scrubber at or above certain speeds in order to reduce the potential for harm due to friction between the scrubber and the screen. The brake can be particularly useful when pressurized air is sent through the irrigation system in order to reduce the rotational speed of the scrubber against the screen to minimize harm to the screen by the scrubber. In order to reduce debris in the flow path between the inlet passage and the outlet passage, a radial seal is positioned partially in the opening of the diaphragm valve to restrict the flow of debris.

The diaphragm valve has multi-stage sealing in order to slow the time required to shift the diaphragm valve from its open position to its closed position, and thereby reduce any pressure spike and water hammer effect. The multi-stage sealing is accomplished using two seals, a first, face seal and a second, radial seal. The first seal engages a face of the diaphragm valve seat to fully block fluid flow through the opening thereof in a final sealing stage. Prior to the final sealing stage, the second seal engages an inner, inclined surface of the diaphragm valve seat during an initial sealing stage. During this engagement, fluid flow through the opening of the diaphragm valve seat is partially but not fully blocked due to bypass cut-outs formed in the inclined surface. Accordingly, in the initial sealing stage, the second seal is engaged with the inclined surface but fluid flow is still permitted therepast through the bypass cut-outs.

In order to reduce the energy lost in the fluid flow exiting the opening of the diaphragm valve seat, an arcuate surface is provided in the outlet passage to redirect the fluid flow. The fluid exiting the opening of the diaphragm valve decelerates due to the increase in flow area of the region after the opening as compared to that of the opening. The arcuate surface allows a more gradual expansion with reduced energy losses as compared to a corner intersection, which can undesirably cause increased energy losses due to the resulting rapid expansion. Reduced energy losses in the fluid can result in advantageously improved fluid flow characteristics of the diaphragm valve.

The improved bleed properties of the diaphragm valve are achieved by using components that redirect bled fluid away from a user, diffuse the velocity of the bled fluid so that spray due to high velocity fluid is minimized and facilitate flushing of debris. The improved bleed properties of the diaphragm valve are achieved by using components that both diffuse excess velocity of the bled fluid and direct the flow away from the user. A fluid path provided is selectively openable to permit the pressurized fluid, including any air, to escape from the control chamber. The components can include a bleed member and a flow-control handle that are configured to both redirect the bled fluid away from the user, such as toward the diaphragm valve, and to permit the bled fluid to flow for a predetermined distance in a confined but expanding area that diffuses the velocity of the bled fluid in order to reduce undesirable spray. To facilitate flushing of debris, the diaphragm assembly is configured to be able to rise to its maximum height during bleeding to clear debris that may be clogging the flow path between the inlet and outlets of the valve. In addition, flushing of debris that may be clogging the control chamber fluid path can be facilitated by enlarging the fluid passage between the inlet of the valve and the control chamber. The flushing can be achieved by manipulating one or both of the flow control handle and the bleed member.

BRIEF DESCRIPTION OF THE DRAWINGS

FIG. 15a is a perspective view of the bleed screw of FIG. 15; and

DETAILED DESCRIPTION OF THE DRAWINGS

A diaphragm valve 100 is disclosed herein and aspects of which are illustrated in FIGS. 1-16 that has improved flow, including being adapted to reduce debris in the flow paths, reduce the water hammer effect, reduce the energy lost during flow, and improve bleed operation. The reduction of debris in the control flow path is achieved using a screen positioned in the control flow path which is cleaned by a rotatable scrubber in one aspect of the diaphragm valve 100. In another aspect, a radial second seal is provided that restricts passage of debris. The reduction in the water hammer effect is achieved using multi-stage sealing. The reduction in the flow energy lost is achieved by shaping specific surfaces in contact with the fluid flow at specific locations. Finally, the improved bleed operation is achieved using an assembly that results in redirection of bled, pressurized fluid away from a user, diffusing the velocity of the bled fluid to reduce spray and permits flushing of debris.

Figure 1:
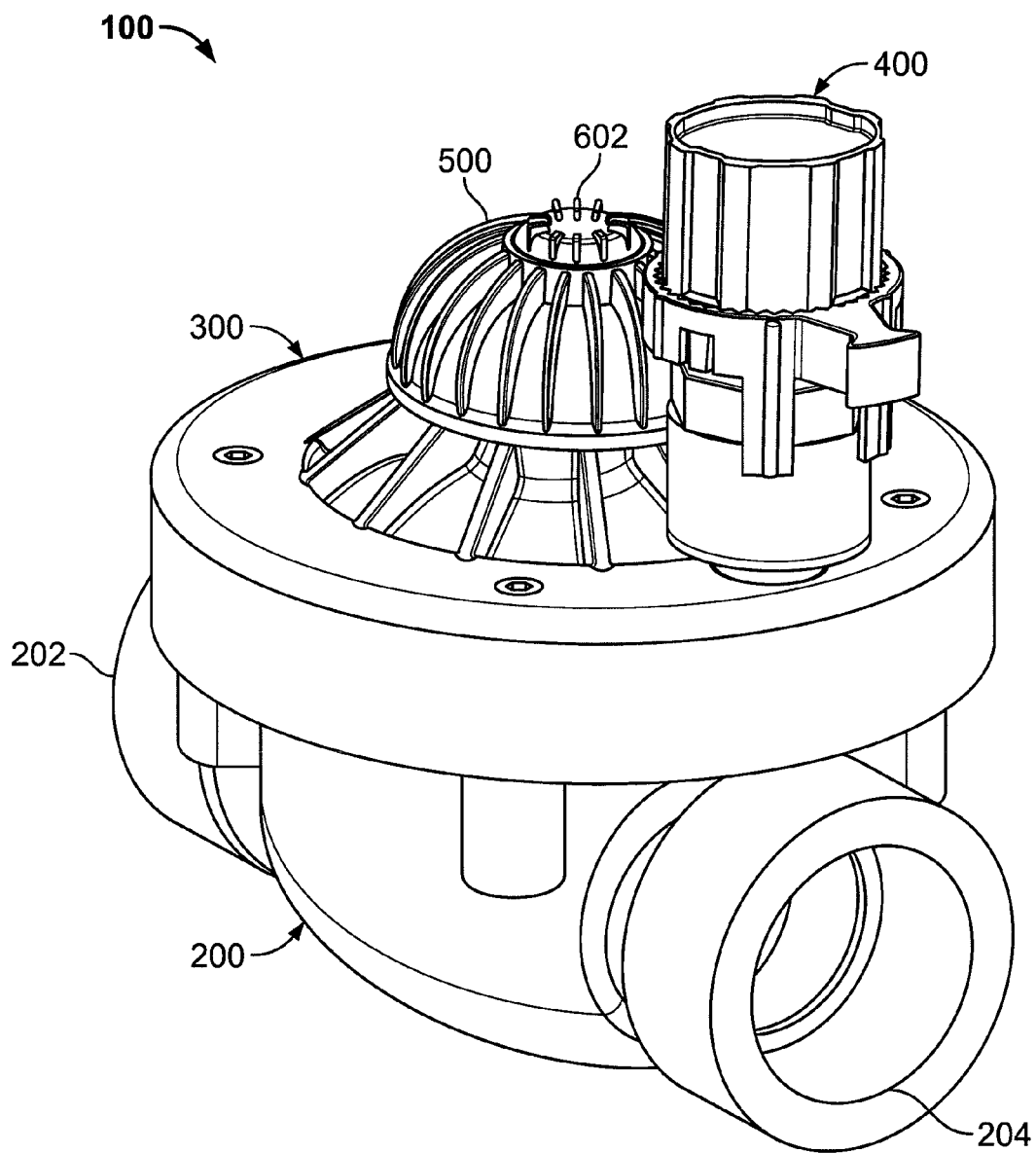
FIG. 1 is a perspective view of a diaphragm valve for irrigation systems showing a valve body, a bonnet, a flow-control handle, a bleed screw and a solenoid valve.
Figure 2:
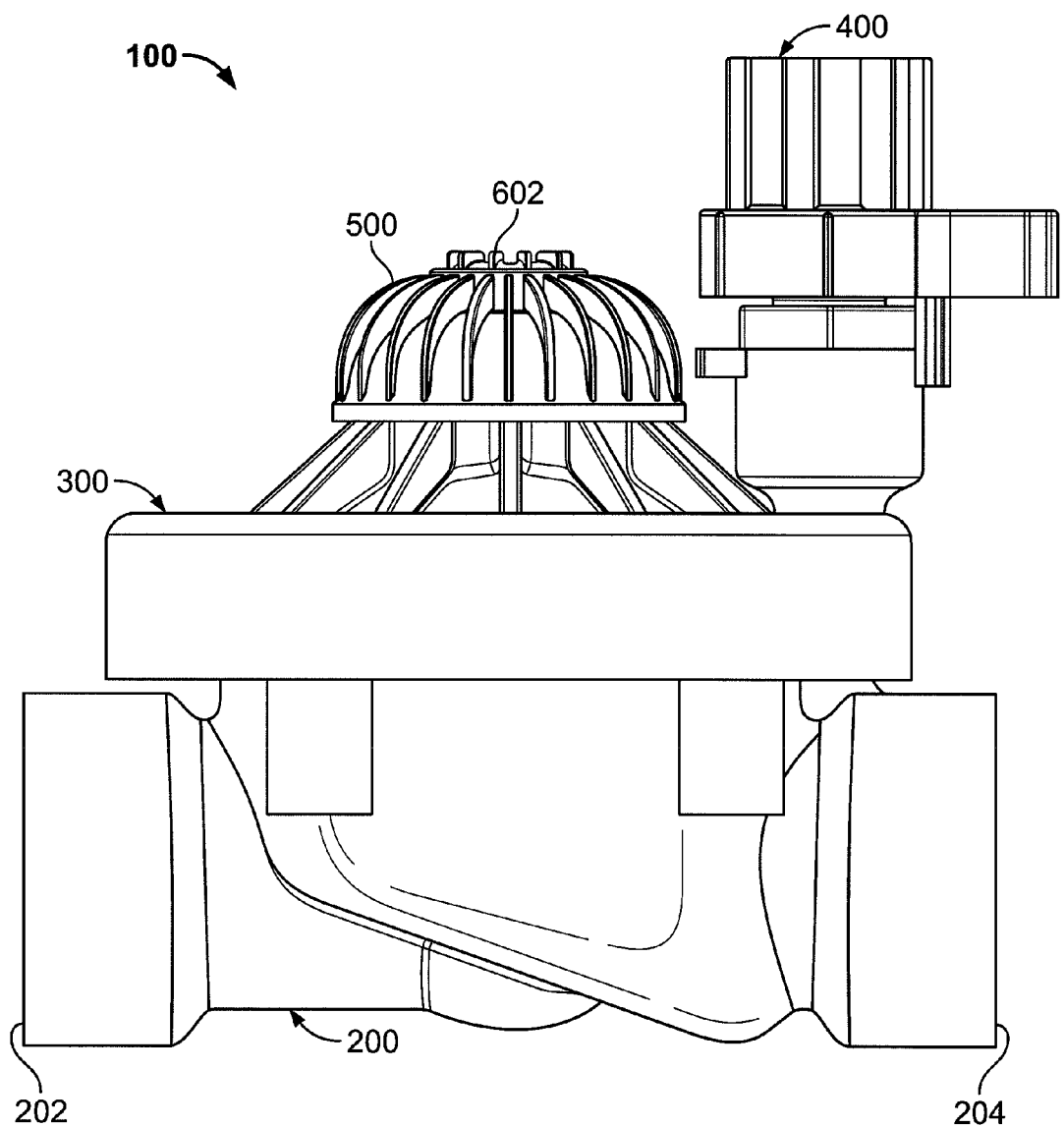
FIG. 2 is a side elevation view of the diaphragm valve of FIG. 1.
Figure 3:
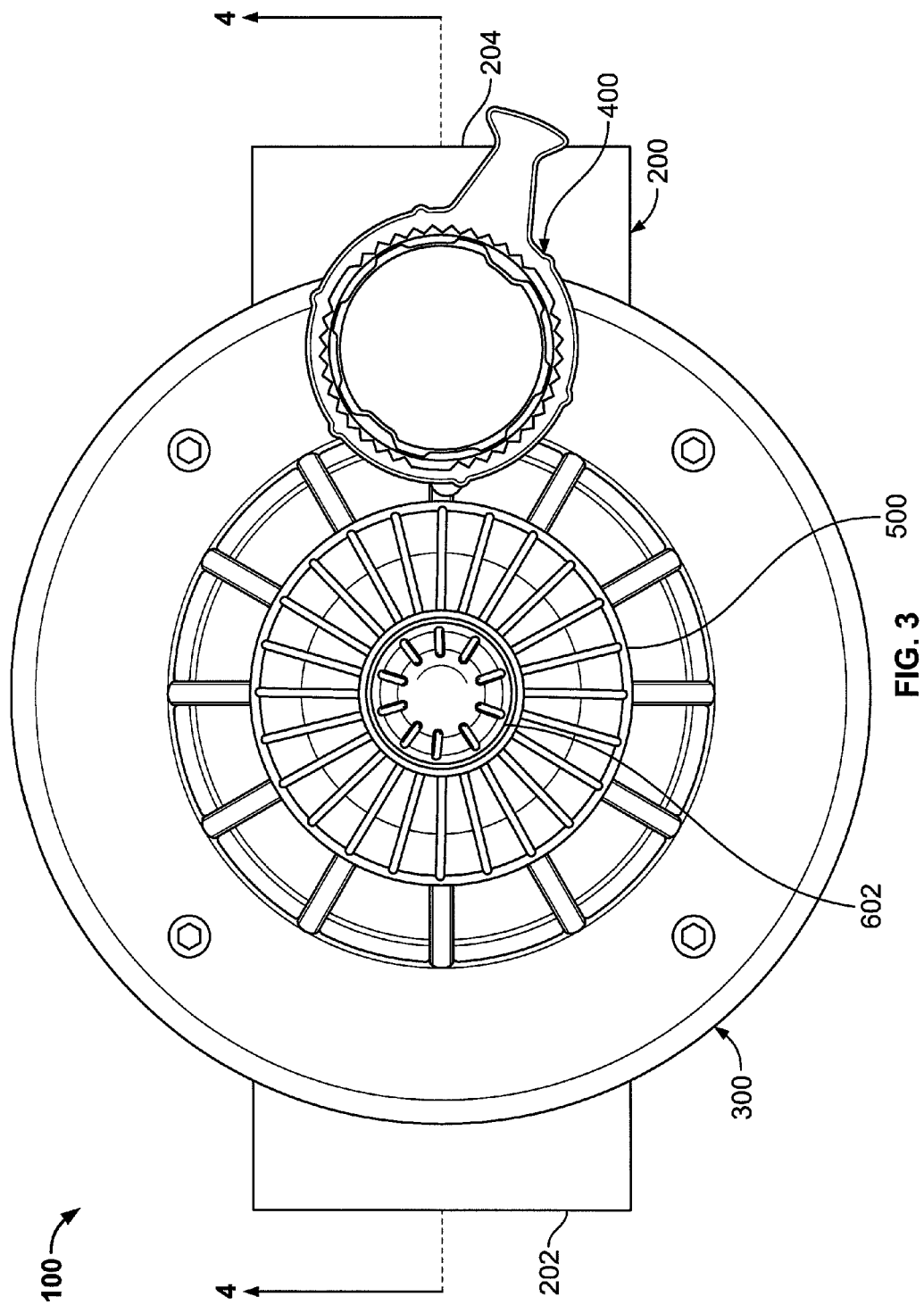
FIG. 3 is a top plan view of the diaphragm valve of FIG. 1.

The diaphragm valve 100 consists of a valve body 200, a bonnet 300 attached to the valve body 200 and a solenoid valve 400 attached to both the bonnet 300 and valve body 200, as illustrated in FIGS. 1-3. The diaphragm valve 100 includes an internal, centrally located diaphragm assembly 700 that is shiftable both away from and toward a diaphragm valve seat 224. When the diaphragm assembly 700 is engaged with the diaphragm valve seat 224 fluid flow through the diaphragm valve 100 is blocked. Conversely, when the diaphragm assembly 700 is unengaged with the diaphragm valve seat 224 fluid flow through the diaphragm valve 100 is permitted. In conjunction with the solenoid valve 400, an internal control chamber 304, positioned between the valve body 200 and the bonnet 300, is used to shift the diaphragm assembly 700 relative to the diaphragm valve seat 224.

A generally dome-shaped flow-control handle 500 is positioned over the bonnet 300, on a side of the bonnet 300 opposite from the valve body 200. The flow-control handle 500 permits external adjustments to be made to the spacing, and thus the flow area, between the diaphragm assembly 700 and the diaphragm valve seat 224 when the diaphragm valve 100 is in its open position, as will be discussed in greater detail below. A bleed screw 602 is positioned in a central aperture of the flow-control handle 500, and is part of a flow-control and bleed assembly 600 disposed in the diaphragm valve 100. The bleed screw 602 and bleed assembly 600 permit external bleeding fluid from the control chamber 304, as also will be discussed in greater detail below. The bleed assembly 600 can also be used to flush debris from the flow paths.

Turning now to more of the details of the components, the valve body 200 defines the inlet opening 202 and outlet opening 204, as well as the annular diaphragm valve seat 224 and a divider wall 214 between the inlet fluid passage and the outlet fluid passage. With specific reference to FIG. 4, the inlet fluid passage includes a larger diameter segment 206 immediately adjacent the inlet opening 202 that is sized to be joined to piping of an irrigation system. A reduced diameter segment 210 is positioned adjacent to the larger diameter segment 206. A ledge 208 between the two segments 206 and 208 restricts intrusion of the piping into the reduced diameter segment 210. Similarly, the outlet fluid passage includes a larger diameter segment, 216, a reduced diameter segment 220 and a ledge 218 therebetween. Both of the larger diameter segments 206 and 216 are shown as smooth to accommodate a glue joint with pipe fixtures. However, the larger diameter segments 206 and 216 can alternately be threaded to accommodate threaded pipe fixtures. An axis of the diaphragm valve seat 224 is positioned generally perpendicular to a longitudinal axis extending through the inlet opening 202. The diaphragm valve seat 224 has a central opening circumscribing the upper edge of an inner wall 228 of the valve body 200. A curved segment 212 is disposed in the valve body 200 opposite the diaphragm valve seat 224 to facilitate directing the fluid flow through the inlet fluid passage and to the opening of the diaphragm valve seat 224. A similar curved segment 222 is disposed on the opposite side of the divider wall 214 in the outlet fluid passage to facilitate directing the fluid flow to the outlet opening 204. On the outlet side of the valve body 200, a larger diameter bore 254 is sized to receive a portion of the solenoid body 400, as will be described in greater detail below, and a smaller diameter bore 252 permit drainage of fluid from the larger diameter bore 254 into the reduced diameter segment 220 of the outlet passage.

The valve body 200 also includes an upstanding annular wall 240 positioned to define a portion of the fluid flow path downstream of the opening of the diaphragm valve seat 224. The wall 240 includes a first ledge 242 and a second ledge 244 use in positioning the diaphragm assembly 700, as will be discussed in greater detail below. The wall 240 is positioned to be engaged with the bonnet 300. To this end, a plurality of bolt holes are provided in the bonnet 300 and are aligned with bolt-receiving bores in the valve body 200 to permit the bonnet 300 to be secured to the valve body 200 using a plurality of bolts.

The bonnet 300 has a generally dome-shaped portion 308 surrounded by a peripheral flange 336 with a depending wall 330, as illustrated in FIGS. 4, 5, 14 and 16. A central opening 306 is formed through the dome-shaped portion 308 of the bonnet 300 for accommodating components of the flow-control assembly 540 and the bleed screw assembly 610, which will be discussed in greater detail below. The central opening 306 includes a larger diameter opening 316, an intermediate diameter opening 318 and a smaller diameter opening 315. A seat 324 and aligned opening 326 are formed in the peripheral flange 336 of the bonnet 300 in order to accommodate the solenoid valve 400. A fluid passage 328 formed in the dome-shaped portion 308 of the bonnet 300 extends between the control chamber 308 and an outer chamber 322 formed between the solenoid valve 400 and the seat 324 in the flange 336 of the bonnet 300, as also will be discussed in greater detail below.

Raised arcuate ribs 312 are positioned on the undersurface of the dome-shaped portion 308 of the bonnet 300, and form a spring seat 310 at their intersection with the undersurface. A compression spring 350 is positioned around the raised arcuate ribs 312 and in the spring seat 310. The spring 350 extends into the control chamber 304 and abuts a top plate 702 of the diaphragm assembly 700 in order to bias the assembly 700 to its closed position where the first and second seals 760 and 780 are engaged with the diaphragm valve seat 224 in order to block fluid flow through the opening 228 of the diaphragm valve seat 224 and thus through the diaphragm valve 100.

Figure 6:
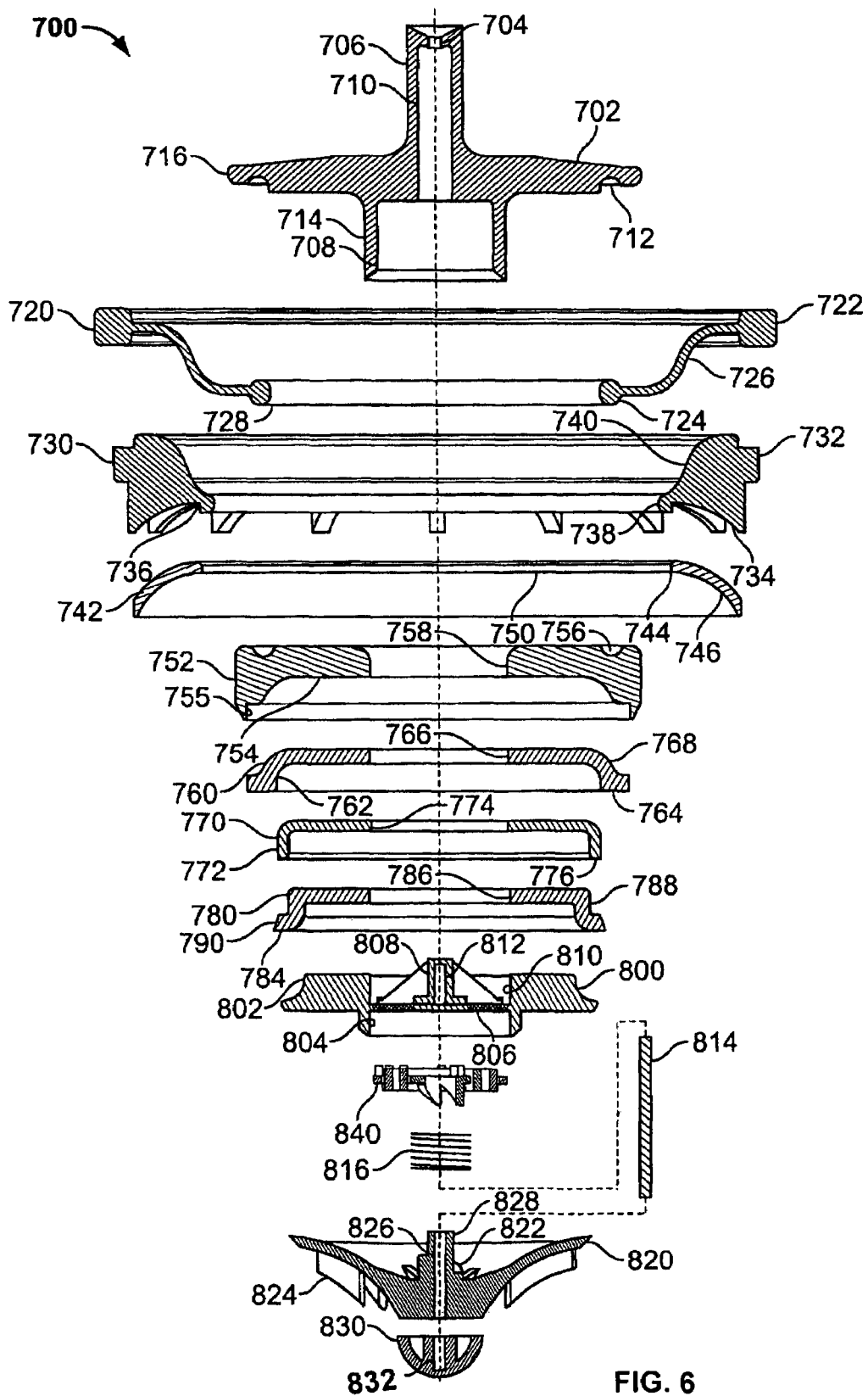
FIG. 6 is an exploded section view of a diaphragm valve stem assembly of the diaphragm valve of FIG. 1.
Figure 7:
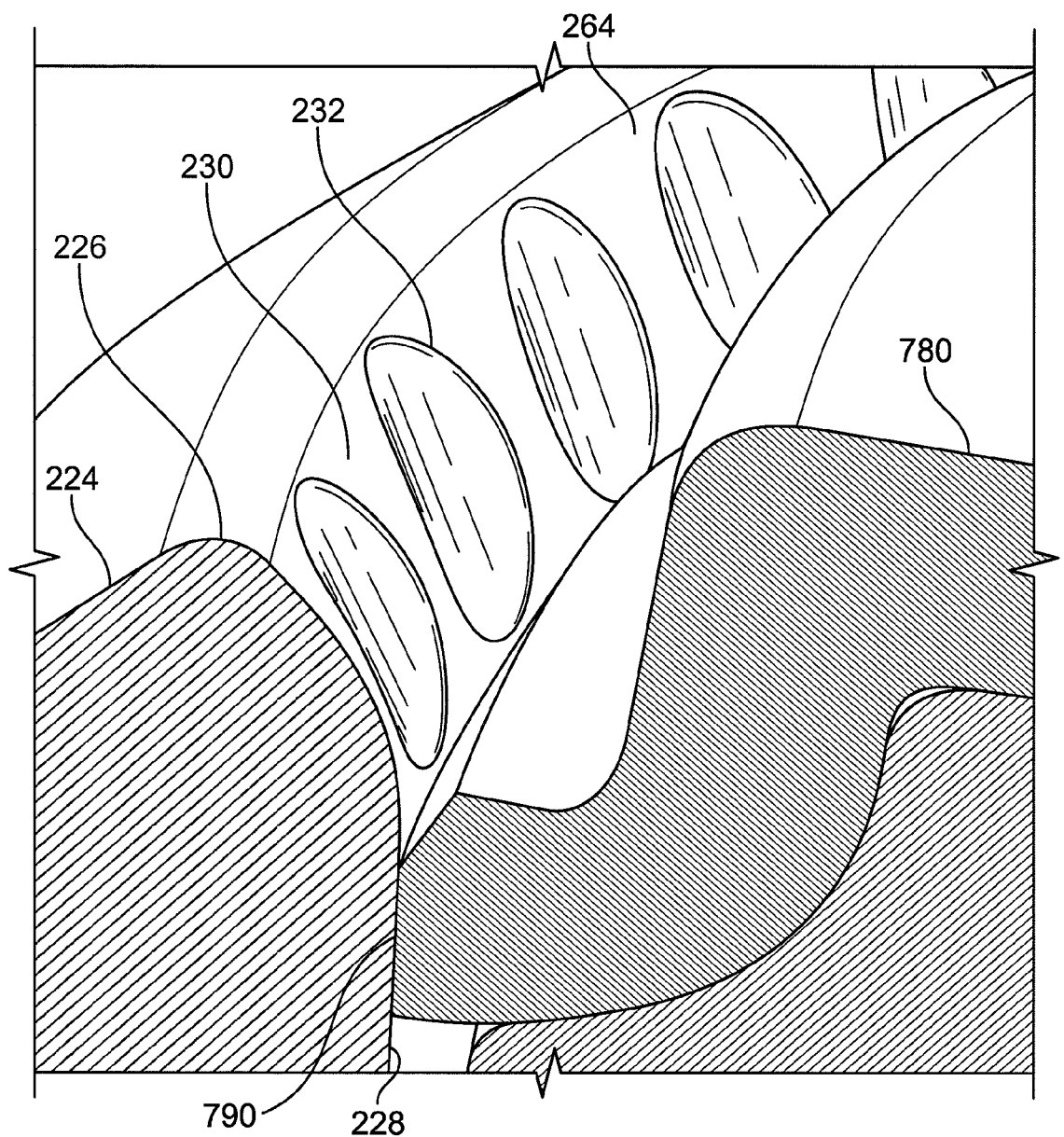
FIG. 7 is a partial perspective view of a seat and second seal showing the second seal in the final sealing stage.
Figure 8:
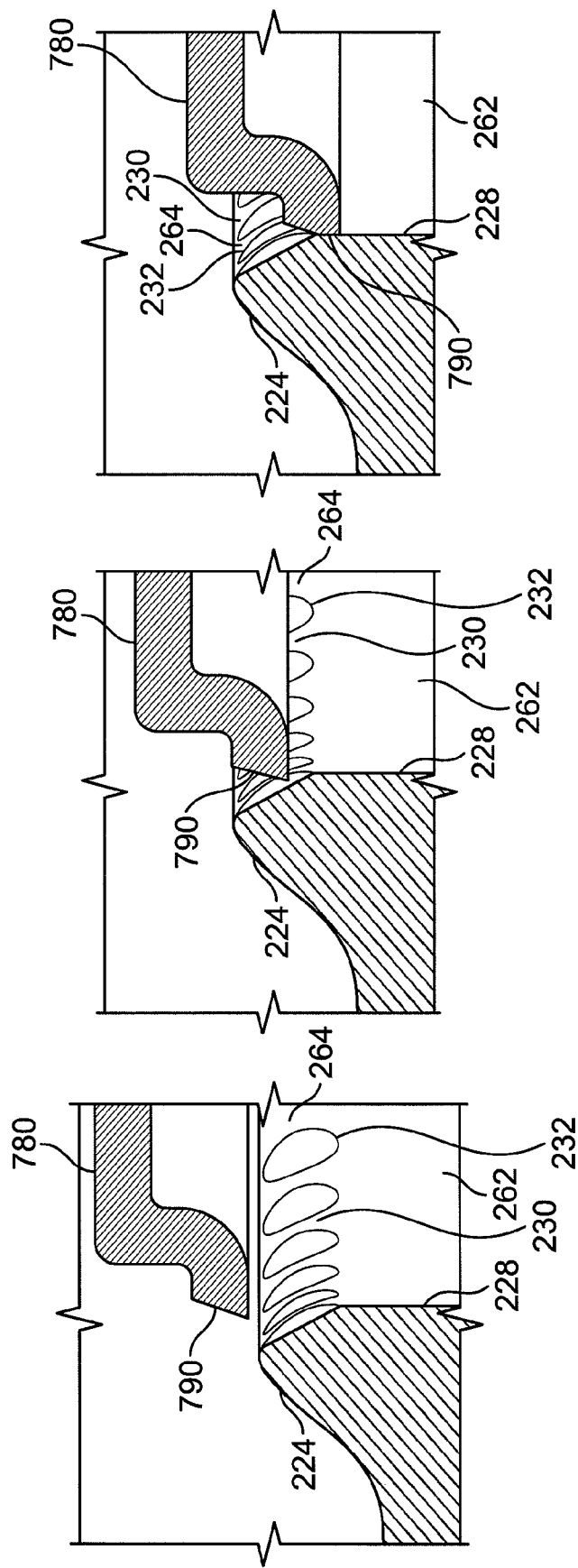
FIG. 8a is a partial section view of the seat and second seal showing the second seal in the open stage.
FIG. 8b is a partial section view of the seat and second seal similar to FIG. 8a but showing the second seal in the initial sealing stage.
FIG. 8c is a partial section view of the seat and second seal similar to FIG. 8a but showing the second seal in the final sealing stage.

The diaphragm assembly 700 includes a multitude of different components, including the first and second seals 760 and 780 and the second seal base 800 and its screen 806. In series, the diaphragm assembly 700 includes a top plate 702, a diaphragm element 720, a diaphragm ring support 730, an annular fairing 742, a first seal support 752, the first seal 760, an intermediate seal support 770, the second seal 780, the second seal base 800, the scrubber 840, a scrubber spring 816, the turbine 820, and an end cap 830, as illustrated in FIG. 6.

The diaphragm assembly 700 functions to both selectively permit fluid flow through the diaphragm valve 100 by being either engaged or unengaged with the diaphragm valve seat 224. To this end, the diaphragm assembly 700 includes a first seal 760 and a second seal 780. The first seal 760 is positioned to abut against a face 226 of the diaphragm valve seat 224, while the second seal 780 is positioned to engage an interior diameter 228 of the diaphragm valve seat 224. The use of both first and second seals 760 and 780, as well as the configuration of the interior diameter 228 of the diaphragm valve seat 224, permits for a multi-stage reduction in the flow area between the diaphragm assembly 700 and the diaphragm valve seat 224 when the central stem assembly is being shifted toward the diaphragm valve seat 224 for blocking fluid flow through the diaphragm valve 100. The use of multi-stage reduction in the flow area can reduce the water hammer effect that can occur when, as in typical diaphragm valves having single-stage sealing, the diaphragm valve is suddenly closed and a resulting pressure spike causes potentially harmful vibration to the system.

The diaphragm valve seat 224 includes an annulus that projects upward from the surrounding portion of the valve body 200, and includes a sealing face 226 that is positioned to be engaged by the flange 764 of the first seal 760 when the diaphragm valve 100 is in its closed position to block fluid flow through the opening 262 of the diaphragm valve seat 224. The diaphragm valve seat 224 also includes the inner wall 228. Extending radially inward between the sealing face 226 and the inner wall 228 of the diaphragm valve is an inclined surface 264, as illustrated in FIGS. 8A, 8B and 8C. The inclined surface 264 includes a plurality of bypass cut-outs 232 spaced by a plurality of sealing flats 230. The inclined surface 264, and specifically the bypass cut-outs 232 and sealing flats 230, has a configuration permitting gradual, multi-stage sealing of the opening 262 of the diaphragm valve seat 224 by the first and second seals 760 and 780.

The multi-stage sealing of the diaphragm valve 100 includes an open stage, an initial sealing stage and a final sealing stage. In the open stage, fluid flow is permitted through the opening 262 of the diaphragm valve seat 224, which corresponds to the open position of the diaphragm valve 100, thereby permitting fluid flow between the inlet opening 202 and the outlet opening 204 of the valve body 200. Both of the first and second seals 760 and 780 are spaced from engagement with the diaphragm valve seat 224 and there is a flow area between the same through which fluid can flow, as illustrated in FIG. 8A. This flow area is a factor in determining the amount of fluid flowing between the inlet opening 202 and the outlet opening 204 of the valve body 200 when the diaphragm valve 100 is in its open position. In the initial sealing stage, illustrated in FIG. 8B, the spacing between the first and second seals 760 and 780 and the diaphragm valve seat 224 is decreased as compared to the open stage. The tip 790 of the second seal 780 is engaged with the inclined surface 264 of the interior of the diaphragm valve seat 224. More specifically, the inclined surface 264 is engaged with the sealing flats 230 to block fluid flow therepast. However, fluid flow is permitted between tip 790 of the second seal 780 and the bypass cut-outs 232. In the initial sealing stage, the first seal 760 is not engaged with the sealing face 226 of the diaphragm valve seat 224. Thus, in the initial sealing stage, the fluid flow through the opening 262 of the diaphragm valve seat 224, and thus between the inlet opening 202 and outlet opening 204 of the valve body 200, is partially but not fully blocked and the flow area is decreased but not to zero. In the final sealing stage, the flange 764 of the first seal 760 is engaged with the sealing face 226 of the diaphragm valve seat 224 to block fluid flow through the opening 262 of the diaphragm valve seat 224, and thus the diaphragm valve 100 is in its closed position. As illustrated in FIG. 8C, the tip 790 of the second seal 780 may also block fluid flow through the opening 262 of the diaphragm valve seat 224 when it optionally is engaged with the inner wall 228 of the diaphragm valve seat 224.

The multi-stage sealing of the diaphragm valve 100 has the benefits of providing a more gradual blocking of the opening 262 of the diaphragm valve seat 224 as compared to typical single-stage diaphragm valves. The more gradual blocking advantageously reduces the suddenness of the shifting of the diaphragm valve 100 from its open position to its closed position, which can lead to a reduction in the water hammer effect and resulting harmful vibrations to the components of the diaphragm valve 100 and the connected irrigation system. In a typical single-stage diaphragm valve, the water hammer effect is due to a rapid reduction in the flow area between seal and the diaphragm valve seat, which is illustrated in the bottom solid line of FIG. 13. This rapid reduction can lead to a pressure spike in the fluid flow as the fluid flow through the diaphragm valve seat is suddenly ceased, as illustrated in the top solid line of FIG. 13. As can be seen, the pressure spike has a peak that is larger than the fluid pressure when the single-stage diaphragm valve is in its closed position. By comparison, the multi-stage sealing of the presently-disclosed diaphragm valve 100 has a comparatively less-rapid reduction in flow area between the first and second seals 760 and 780 and the diaphragm valve seat 224, as illustrated in the predicted, lower dashed flow area line of FIG. 13. The less-rapid reduction in flow area of the presently-disclosed diaphragm valve 100 is believed to reduce any resulting pressure spike and the resulting water hammer effect, as illustrated in the predicted, upper dashed pressure line of FIG. 13. Notably, it is believed that during shifting from the open position to the closed position the presently-disclosed diaphragm valve 100 will not experience a pressure significantly greater than the final line pressure due to the multi-stage sealing.

Figure 12:
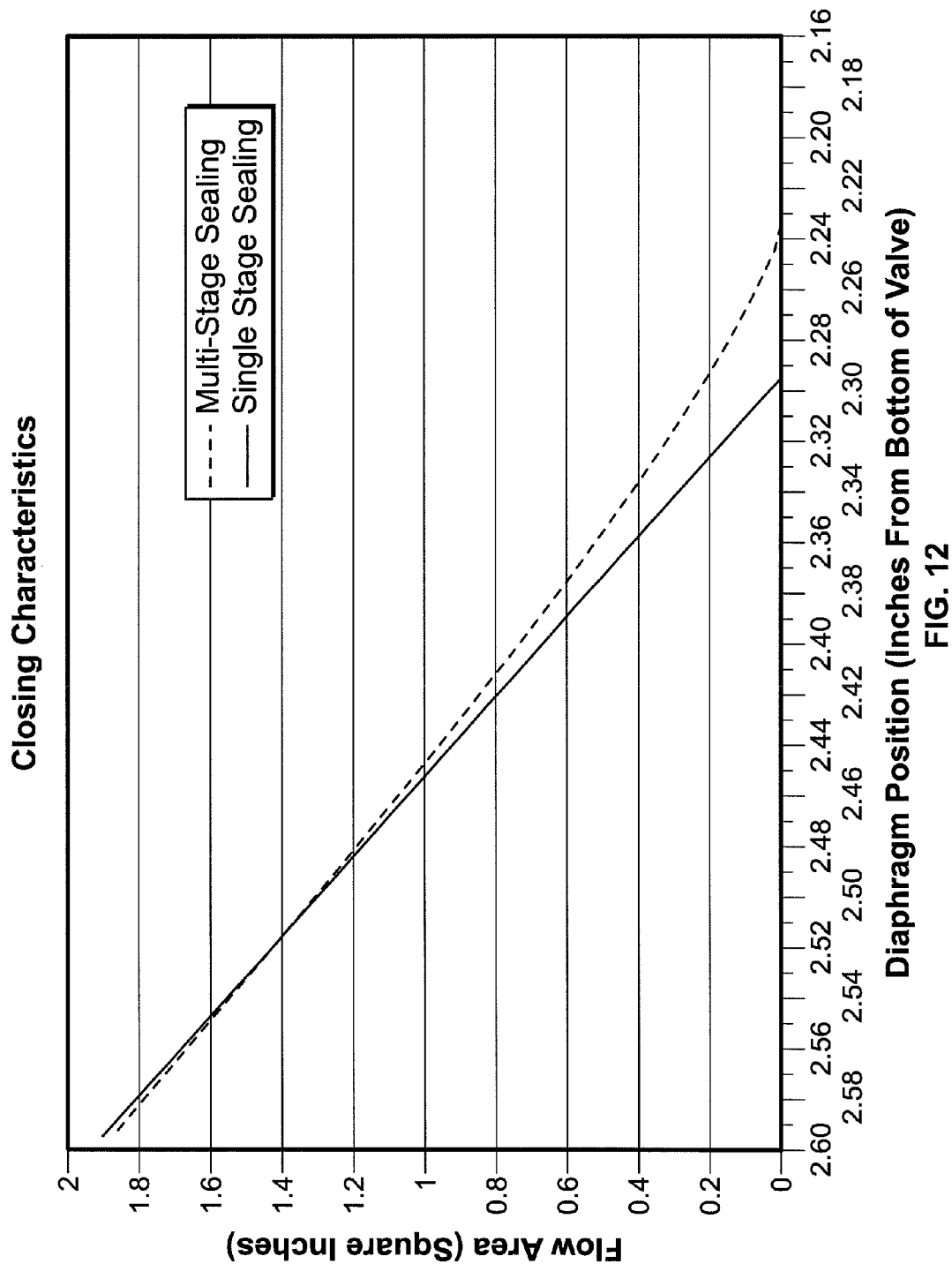
FIG. 12 is a graph comparing the flow area with the position of the second seal relative to the seat of a prior art diaphragm valve and the diaphragm valve disclosed herein.
Figure 13:
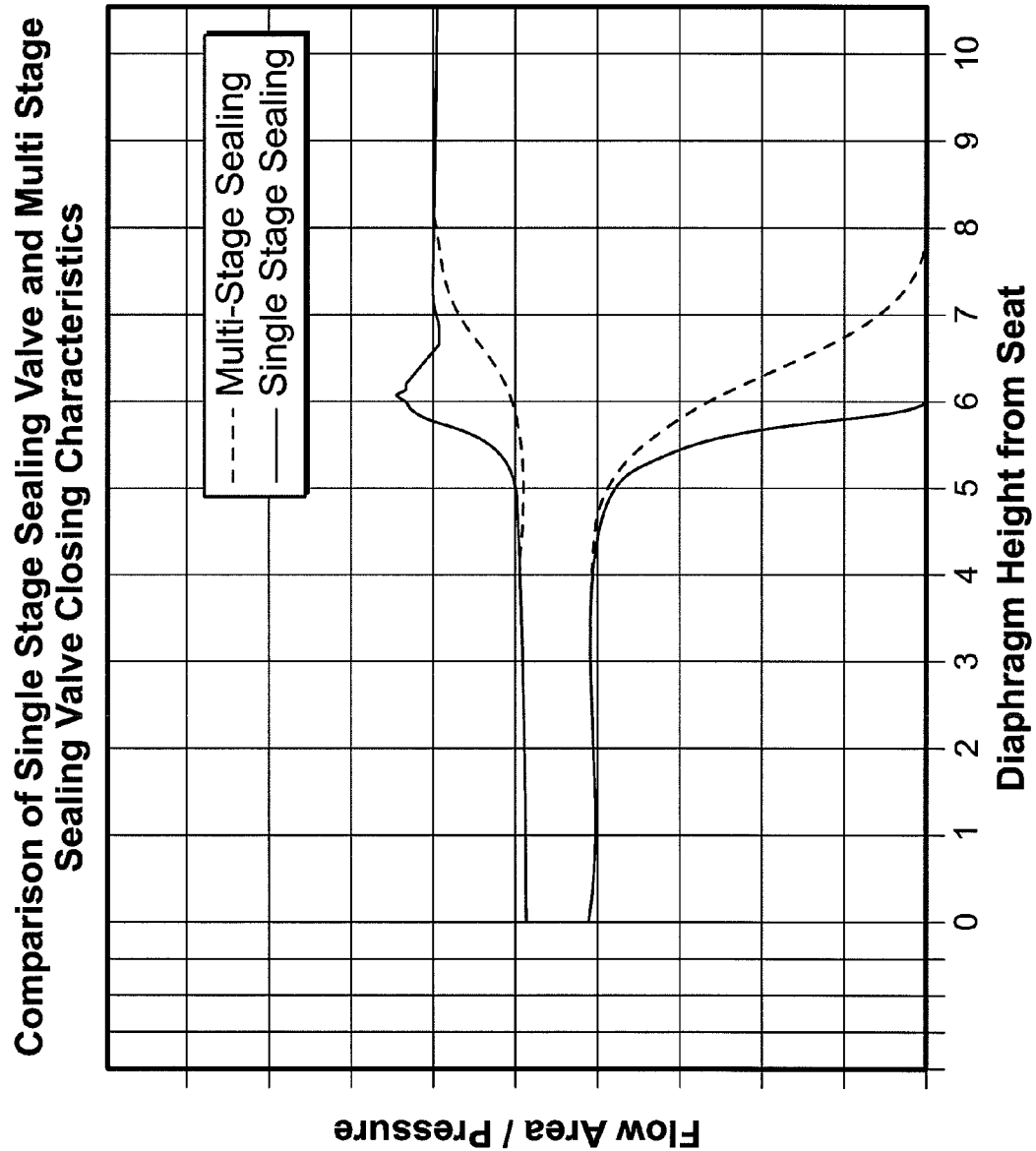
FIG. 13 is a graph comparing the flow area and upstream pressure with the position of the second seal relative to the seat of a prior art diaphragm valve and the diaphragm valve disclosed herein.

As can be seen on FIG. 12, using the presently-disclosed multi-stage design results in a more gradual closing of the valve. This gradual closing can reduce or eliminate the water hammer experienced when closing more conventionally designed valves. The data for the comparative example of FIG. 12 was calculated from a 3-D electronic model of the presently-disclosed, multi-stage diaphragm valve 100 and an actual sample of a typical single-stage diaphragm valve, set forth in below:

| Seal Height from Bottom of Valve (inches) | Flow Area with Multi-Stage Sealing (square inches) | Flow Area with Single Stage Sealing (square inches) |
| --- | --- | --- |
| 2.60 | 1.87560121 | 1.9038096 |
| 2.59 | 1.81539149 | 1.84034928 |

-continued

| Seal Height from Bottom of Valve (inches) | Flow Area with Multi-Stage Sealing (square inches) | Flow Area with Single Stage Sealing (square inches) |
| --- | --- | --- |
| 2.58 | 1.755256759 | 1.77688896 |
| 2.57 | 1.695968146 | 1.71342864 |
| 2.56 | 1.636620138 | 1.64996832 |
| 2.55 | 1.575534126 | 1.586508 |
| 2.54 | 1.516854422 | 1.52304768 |
| 2.53 | 1.456262528 | 1.45958736 |
| 2.52 | 1.397723779 | 1.39612704 |
| 2.51 | 1.338204138 | 1.33266672 |
| 2.50 | 1.278813392 | 1.2692064 |
| 2.49 | 1.220076868 | 1.20574608 |
| 2.48 | 1.161091864 | 1.14228576 |
| 2.47 | 1.102416403 | 1.07882544 |
| 2.46 | 1.044191258 | 1.01536512 |
| 2.45 | 0.986065635 | 0.9519048 |
| 2.44 | 0.928530648 | 0.88844448 |
| 2.43 | 0.871871697 | 0.82498416 |
| 2.42 | 0.816051664 | 0.76152384 |
| 2.41 | 0.759976949 | 0.69806352 |
| 2.40 | 0.704932443 | 0.6346032 |
| 2.39 | 0.648821391 | 0.57114288 |
| 2.38 | 0.596044979 | 0.50768256 |
| 2.37 | 0.543663129 | 0.44422224 |
| 2.36 | 0.492500753 | 0.38076192 |
| 2.35 | 0.441588822 | 0.3173016 |
| 2.34 | 0.392043549 | 0.25384128 |
| 2.33 | 0.344036594 | 0.19038096 |
| 2.32 | 0.296751764 | 0.12692064 |
| 2.31 | 0.25154822 | 0.06346032 |
| 2.30 | 0.207538993 | 0 |
| 2.29 | 0.16511897 | 0 |
| 2.28 | 0.125335332 | 0 |
| 2.27 | 0.087439785 | 0 |
| 2.26 | 0.052090667 | 0 |
| 2.25 | 0.019476048 | 0 |
| 2.24 | 0.000815 | 0 |
| 2.23 | 0.000772 | 0 |
| 2.22 | 0.000664 | 0 |
| 2.21 | 0.000507 | 0 |
| 2.20 | 0.00032 | 0 |
| 2.19 | 0.000134 | 0 |
| 2.18 | 0.000016 | 0 |
| 2.17 | 0 | 0 |

The initial position shown was chosen because the flow area for a traditional face seal and for the radial seal 780 are approximately equal at this position. From this position the profiles of the closing characteristics begin to diverge, and illustrate the advantages of the multi-stage sealing of the diaphragm valve 100 as compared to typical single-stage diaphragm valves. As shown by the data in the above example, the typical single-stage diaphragm valve shifts from the initial or "open" position to its closed position 0.130 inches earlier than is calculated for the multi-stage diaphragm valve 100. Moreover, there is a sharp discontinuity between the slope of the curve at closure for the typical single stage valve. This discontinuity correlates to a rapid deceleration of the flow as the valve slams shut. By comparison, the slope of the curve for the multi-stage diaphragm valve 100 gradually decreases as it approaches closure, shown by the comparatively smooth transition approaching the horizontal axis on the graph as the valve 100 closes. This decreasing slope and smooth transition to closed can correlate to a more gradual closing and reduced pressure spike and reduction in the corresponding water hammer effect. The slope of the curve, the change in slope, and the smooth transition at closure can be tailored according to particular requirements of the diaphragm valve 100, such as by varying the shapes of the inclined surface 264 and the bypass cut-outs 232, the volume of the cut-outs 232 and the ratio between the sealing flats 230 and the cut-outs 232.

The second seal 780 also functions to reduce debris that flows to the first seal 760 by providing an obstruction to debris in the opening 262 of the diaphragm valve seat 224. This can advantageously reduce debris that contacts the first seal 760, and in particular debris that may abrasively contact the flange 764 of the first seal 760 and degrade its capability to fully engage the sealing face 226 of the diaphragm valve seat 224, which can result in a diaphragm valve 100 having a prolonged life.

The diaphragm assembly 700 also functions to supply operating fluid to the control chamber 304 positioned between the bonnet 300 and valve body 200. The supply of operating fluid to the control chamber 304 is continuously available when the diaphragm valve 100 is supplied with fluid, regardless of whether the diaphragm valve 100 is in is open position or its closed position.

The fluid supplied to the diaphragm valve can contain dirt or other debris that can adversely impact the operation of the diaphragm valve 100. In particular, debris can degrade the seals and can clog the small fluid passages in the diaphragm valve 100. To reduce the amount of debris in the control chamber 304, a screen or filter 806 is positioned in the flow path between the inlet passage and the control chamber 304. Furthermore, a rotatable scrubber 840 is positioned adjacent to the screen 806 to remove debris from the surface of the screen 806 to reduce clogging of the screen 806 due to accumulation of debris. The rotatable scrubber 840 is positioned within an annular recess of a second seal base 800. The annular recess is surrounded by upstanding peripheral wall 804. At increased rotational speeds, the scrubber 840 is configured to frictionally contact the peripheral wall 804. The contact is such that the acceleration and rotational speed of the scrubber 840 is slowed in order to reduce damage to the screen 806 by the scrubber 840 due to frictional contact at increased rotational speeds.

Figure 9:
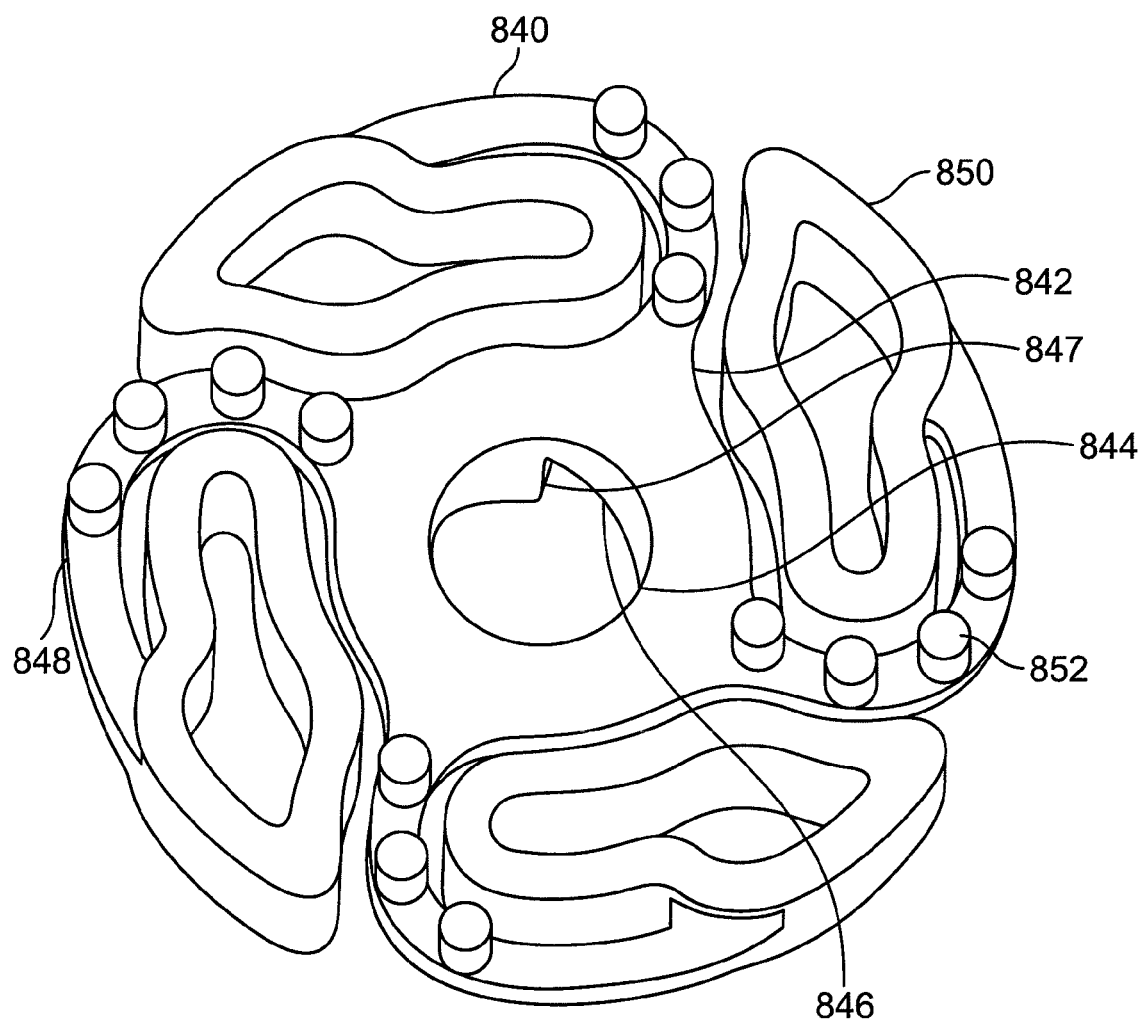
FIG. 9 is a perspective view of a top side of a scrubber of the diaphragm valve stem assembly of the diaphragm valve of FIG. 1.
Figure 10:
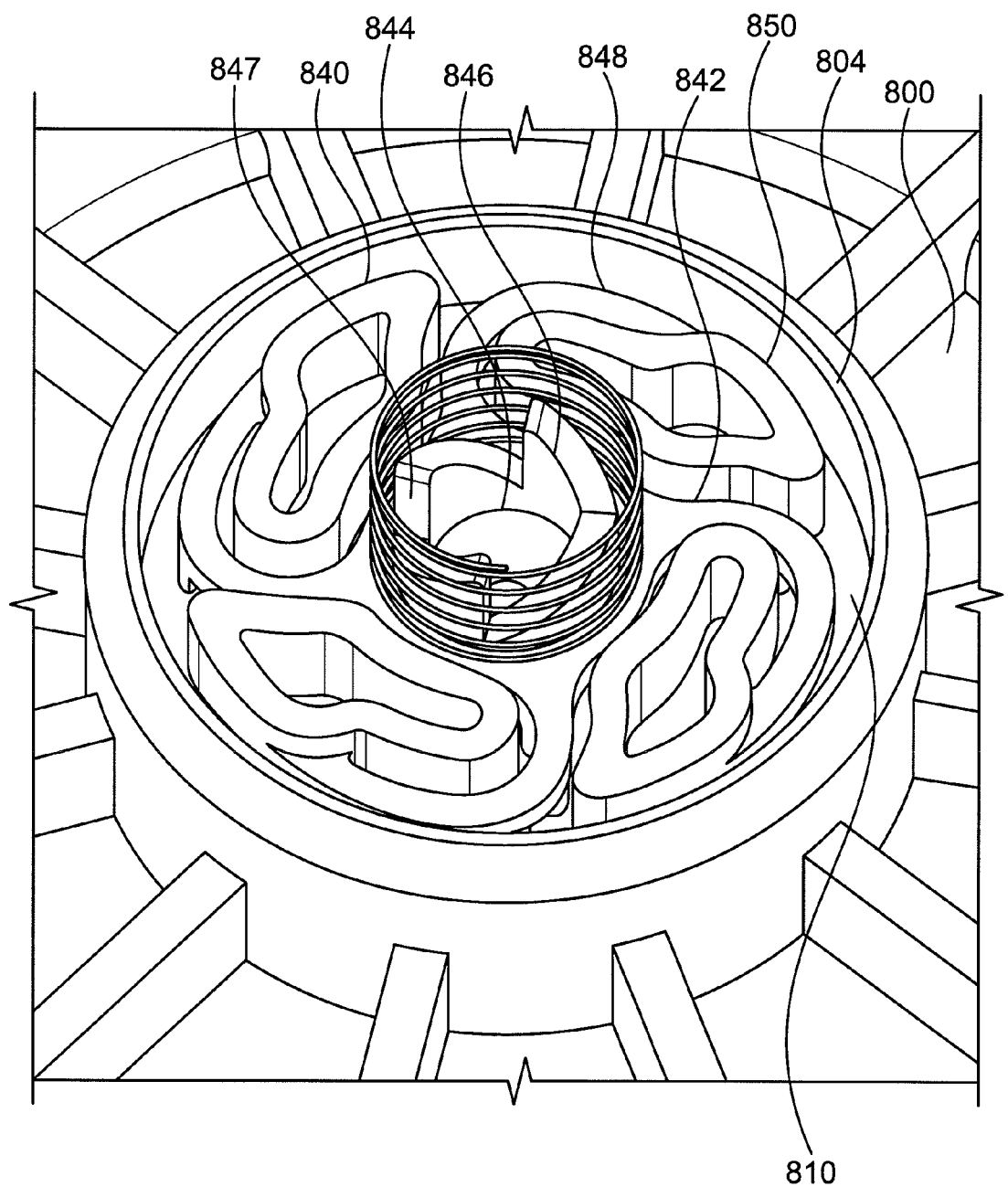
FIG. 10 is a perspective view of a bottom side of the scrubber of FIG. 9 located in a drum of the diaphragm valve stem assembly and showing arms of the scrubber unengaged with the drum.
Figure 11:
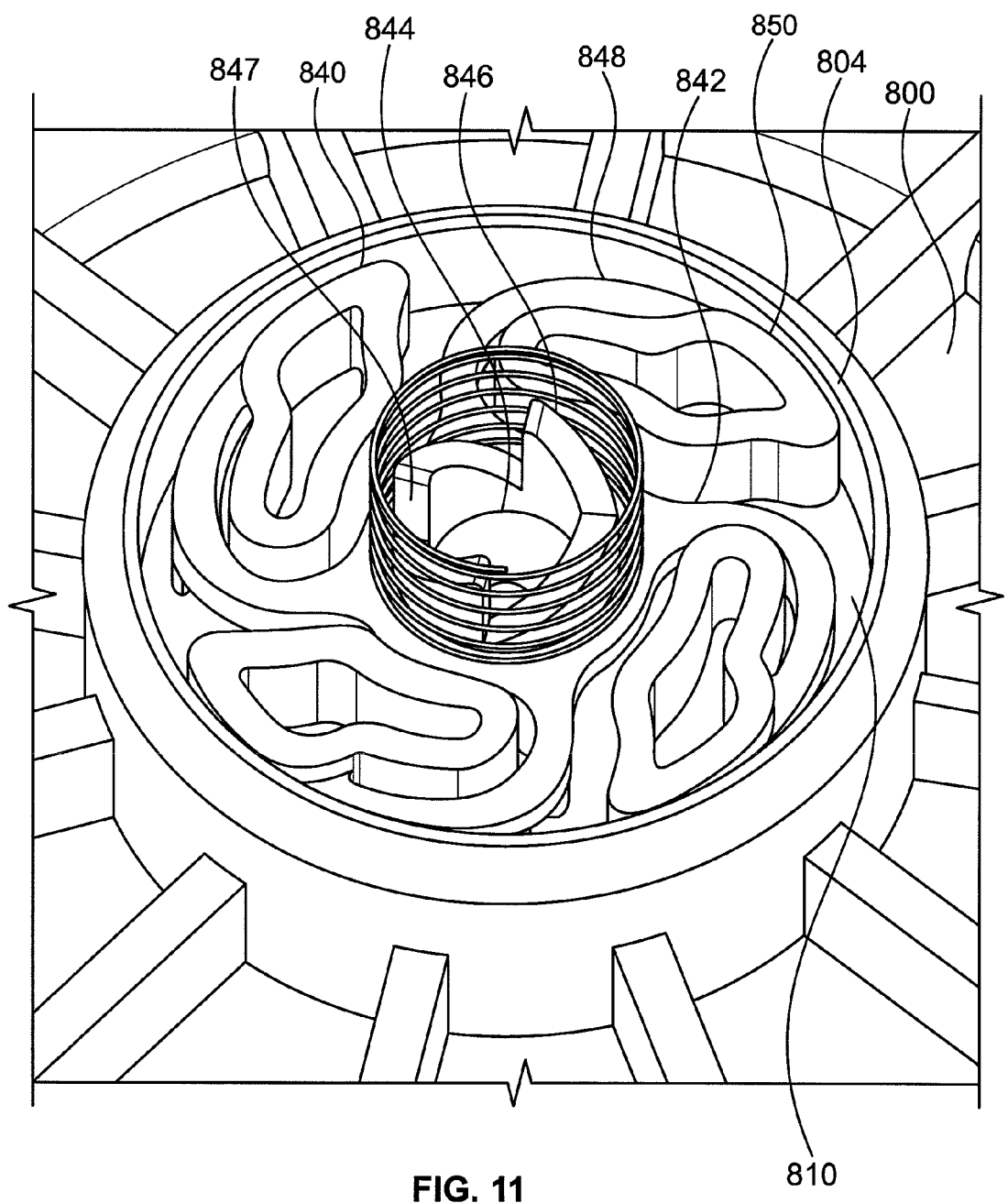
FIG. 11 is a perspective view of a bottom side of the scrubber and drum of FIG. 10 showing arms of the scrubber engaged with the drum.

Turning now to more details of the scrubber 840, a plurality of arms 848 extend outward from a central body 842 in a spiral-line manner, as illustrated in FIGS. 9-11. The central body 842 includes an aperture 844 and, on one side, a series of inclined surfaces 846 surrounding the aperture 844. The scrubber 840 is generally planer in configuration, and has a plurality of cylindrical nubs 852 positioned on the arms 848 and extending perpendicular to the plane of the scrubber 840. The nubs 852 are used to contact the surface of the screen 806 facing the scrubber 840 during rotation of the scrubber 840 relative to the screen 806 in order to scrape debris that may have accumulated from the screen 806.

A turbine 820 is operably connected to the scrubber 840 in order to drive the scrubber 840 for rotation in response to fluid flow. A plurality of inclined surfaces 822 are positioned on one side of the turbine 820 about a central spindle 828 for ease of assembly with the inclined surfaces 846 surrounding the aperture 844 of the central body 842 of the scrubber 840 when the scrubber 840 is positioned about the central spindle 828. The inclined surfaces 822 of the turbine 820 generally mirror the inclined surfaces 846 of the scrubber 840. The scrubber spring 816 is positioned between the scrubber 840 and the turbine 820 in order to bias the scrubber 840, and in particular the nubs 852 of the scrubber 840, against the screen 806 of the second seal base 800. The engagement between the vertical surfaces 847 of the scrubber 840 and corresponding vertical surfaces (not shown) of the turbine 820 provide a positive engagement permitting the turbine 820 to drive the scrubber 840 for rotation. In a preferred embodiment, a plurality of upstanding blades 824 are positioned on an opposite side of the turbine 820 from the scrubber 840 to assist in the rotation of the turbine 820 due to fluid flow. Alternatively, spiral grooves or ribs could be used in place of the upstanding blades 824 to rotate the turbine 820 and thus the scrubber 840.

The ends of the arms 848 each have an enlarged mass 850. The enlarged masses 850 are each thicker than the arms 848 and have an opening therethrough, although other configurations of enlarged masses can also be suitable. During rotation of the scrubber 840 at lower speeds, the enlarged masses 850 are spaced from the inner surface of the peripheral wall 804 of the annular recess of the second seal base 800, as illustrated in FIG. 10. However, at higher speeds, centrifugal force causes the enlarged masses 850 to moved radially outward relative to the central body 842 and frictionally engage the inner surface of the peripheral wall 804 of the annular recess of the second seal base 800, as illustrated in FIG. 11. The frictional engagement between the peripheral wall 804 and the enlarged masses 850 causes the rotational acceleration of the scrubber 840 to decline, and may also cause the rotational speed of the scrubber 840 to slow. The arms 848 and the enlarged masses 850 can be designed so that the frictional engagement with the peripheral wall 804 occurs at predetermined rotational speeds of the scrubber 840. For example, the length and thickness of the arms 848, as well as the weight of the enlarged masses 850, can be selected so that the frictional engagement with the peripheral wall 804 occurs at certain rotational speeds of the scrubber 840.

The top plate 702 includes an elongate upper tube 706 having a longitudinally extending fluid passage 710 and a comparatively shorter and larger diameter lower tube 714 also having a longitudinally extending fluid passage 708. The upper and lower tubes 706 and 714 are spaced by a radially extending disk 716 having a top side and an underside. The upper end of the upper tube 706, opposite the disk 716, has an orifice 704 extending to the fluid passage 710. The underside of the disk 716 has an annular groove 712.

The diaphragm element 720 includes an inner bead 724 surrounding an inner opening 728, an outer bead 722 and a flexible member 726 extending therebetween. The diaphragm ring support 730 is annular and has a central opening 738. An upper, arcuate surface 740 provides a support against which the flexible member 726 of the diaphragm element 720 can rest against when the diaphragm valve 100 is in its closed position. On a side of the ring support 730 opposite the arcuate surface 740, an arcuate undersurface 734 is positioned to abut a fairing 742. The fairing 742 is arcuate and has a central opening 750 bordered by an inner radius 744 that abuts against an inner flange 736 on the underside of the ring support 730. The fairing 742 may be welded to the arcuate undersurface 734 of the diaphragm ring support 730, although other methods of attaching the fairing 742 to either the ring support 730 or relative to the valve body 200 also may be suitable.

An arcuate undersurface 746 of the fairing 742 is shaped to redirect the flow of fluid exiting the opening 262 of the diaphragm valve seat 224 toward the outlet opening 204 in a manner that minimizes the energy loss of the fluid, which can result in more efficient fluid flow through the diaphragm valve. As the fluid exits the diaphragm valve seat 224, it must decelerate due to the smaller flow area of the opening 262 of the diaphragm valve seat 224 as compared to the larger flow area of the adjacent portion of the outlet passage. The arcuately-shaped undersurface 746 of the fairing 742 provides an improved flow path, lacking sharp angles, which can more gradually decelerate the flow in order to minimize the loss of energy in the fluid, which can result in a reduced pressure loss in the diaphragm valve 100 and thereby improved flow characteristics.

A radially extending flange 732 is positioned about the periphery of the ring support 730, and is dimensioned to fit onto the first ledge 242 of the wall 240 of the valve body 100. The outer bead 722 of the diaphragm element 720 is dimensioned to fit partially into the second ledge 244 of the wall 240 of the valve body 100, as well as partially into the groove 332 formed on the underside of the bonnet 300. When the bonnet 300 is attached to the valve body 200, the ring support 730 is fixed relative to the bonnet 300 and the valve body 200. Also when the bonnet 300 is attached to the valve body 200, the outer bead 722 of the diaphragm element 720 is fixed relative to the bonnet 300 and the valve body 200, thereby securing the moving components of the diaphragm assembly 700 relative to the bonnet 300 and valve body 200 via the flexible member 726.

The first seal support 752 has a central opening 758, a lower surface 754 shaped to conform to the upper side of the first seal 760, and an annular groove 756 formed on its upper surface. When the diaphragm assembly 700 is fully assembled, the inner bead 724 of the diaphragm element 720 is sandwiched between the groove 712 on the underside of the disk 716 of the top plate 702 and the groove 756 on the upper surface of the first seal support 752.

The first seal 760 has a central opening 766, a downwardly extending leg 768 about its periphery, and a radially outward extending flange 764 surrounding the end of the leg 768 opposite the central opening 766. The flange 764 is sized to nest in the underside 754 of the first seal support 752, and within a radial pilot 755 formed on the lower surface of the first seal support 752 which limits flexing of the flange 764. The second seal 780 is similar to the first seal 760, having a central opening 786, a downwardly extending leg 788 about its periphery, and a radially outward extending flange 784 surrounding the end of the leg 788 opposite the central opening 786. However, the outward tip of the flange 784 has a tapered end 790. Positioned in a cavity 762 below the undersurface of the first seal 760 and an upper surface of the second seal 780 is the intermediate seal support 770. The intermediate seal support 770 has a central opening 774 and a downwardly extending leg 772. The leg 788 of the second seal 780 has a diameter sized to fit on the inner side of the leg 772 of the intermediate seal support 770 so that the second seal 780 is partially nested in the intermediate seal support 770 to limit flexing of the second seal 780. A distal tip 776 of the leg 772 of the intermediate seal support 770 abuts the flange 784 of the second seal 780 to further limit flexing of the second seal 780. However, the tapered end 790 of the second seal 780 is not abutted by the distal tip 776 of the leg 772 of the intermediate seal support 770 such that the tapered end 790 is permitted to flex during engagement with the inner wall 228 of the diaphragm valve seat 224 of the valve body 200.

Positioned on an opposite side of the second seal 780 from the intermediate support 770 is the second seal support 800. The second seal support 800 includes an annular recess 810 on its upper side, as well as the annular recess 810 on its lower side. The screen 806 is positioned between the two annular recesses 804 and 810, and includes a plurality of openings therethrough to permit the passage of fluid while restricting the passage of debris. An arcuate surface 802 is positioned at the periphery of the second seal support 800, and is dimensioned to nest against the underside of the second seal 780 in order to limit flexing of the second seal 780. However, the maximum diameter of the arcuate surface 802 is such that the tapered end 790 is permitted to flex during engagement with the inner wall 228 of the diaphragm valve seat 224 of the valve body 200.

A stem 808 is positioned within and extending upwardly from the annular recess 804 on the upper side of the second seal support 800. The stem 808 has an internal bore 812 that extends through the screen 806. The upper end of the stem 808, opposite the screen 806, is closed. A shaft 814 is dimensioned to fit in the internal bore 810 of the stem 808, and may be held in place using an interference fit between the inner diameter of the internal bore 812 and the external diameter of the shaft 814. The shaft 814 passes through the aperture 844 in the central body 842 of the scrubber 840 and through an internal bore 826 formed in the turbine 820 that extends through the stem 828. The internal bore 826 of the turbine 820 has an inner diameter that is greater than the outer diameter of the shaft 814 to permit the turbine 820, as well as the scrubber 840, to rotate about the shaft 814. On an opposite side of the turbine 820 from the scrubber 840, the end of the shaft 814 is inserted into a bore 832 of the end cap 830. The inner diameter of the bore 832 of the end cap 830 is sized slightly smaller than the outer diameter of the shaft 814 such that there is an interference fit between the end cap 830 and the shaft 814. In this manner, the shaft 814 is fixed relative to the end cap 830 and the second seal support 800, which sandwich the turbine 820, scrubber spring 816, and scrubber 840 therebetween while permitting the turbine 820, scrubber spring 816, and scrubber 840 to rotate relative to the shaft 814.

In order to assemble the diaphragm assembly 700, the lower tube 714 of the top plate 702 is passed through the opening 728 of the diaphragm element 720, the central opening 758 of the first seal support 752, the opening 766 of the first seal 760, the opening 774 of the intermediate support 770 and the opening 786 of the second seal 780. The distal end of the lower tube 714 is then partially inserted into the upper annular recess 810 of the second seal support 800. The intermediate components, i.e., the diaphragm element 720, the first seal support 752, the first seal 760, the intermediate support 770 and the second seal 780 are sandwiched between the disk 716 of the top plate 702 and the second seal support 800. The outer diameter of the lower tube 714 of the top plate 702 may be slightly larger than the inner diameter of the upper annular recess 810 of the second seal support 800. In a preferred embodiment, the lower tube 714 of the top plate 702 is welded into the annular recess 810 of the second seal support 800. Alternatively, the outer diameter of the lower tube 714 of the top plate 702 and the upper annular recess 810 of the second seal support 800 could be configured to provide a snap fit as a method of assembly.

The flow-control assembly 540 permits adjustments to be made to the flow rate of fluid through the diaphragm valve 100. The flow-control assembly 540 accomplishes these adjustments by controlling the maximum spacing between the diaphragm assembly 700 and the diaphragm valve seat 224 when the diaphragm valve 100 is in its open position, and more particularly the maximum spacing and flow area between the first and second seals 760 and 780 and the diaphragm valve seat 224. Increasing the maximum spacing between the first and second seals 760 and 780 and the diaphragm valve seat 224 will increase the maximum flow rate through the opening 228 of the diaphragm valve seat 224, while decreasing the maximum spacing between the first and second seals 760 and 780 and the diaphragm valve seat 224 will comparatively decrease the maximum flow rate through the opening 228 of the diaphragm valve seat 224. In this manner, the flow rate of fluid through the diaphragm valve 100 can be adjusted by a user according to the requirements of the irrigation system in which the diaphragm valve 100 is installed.

Figure 5:
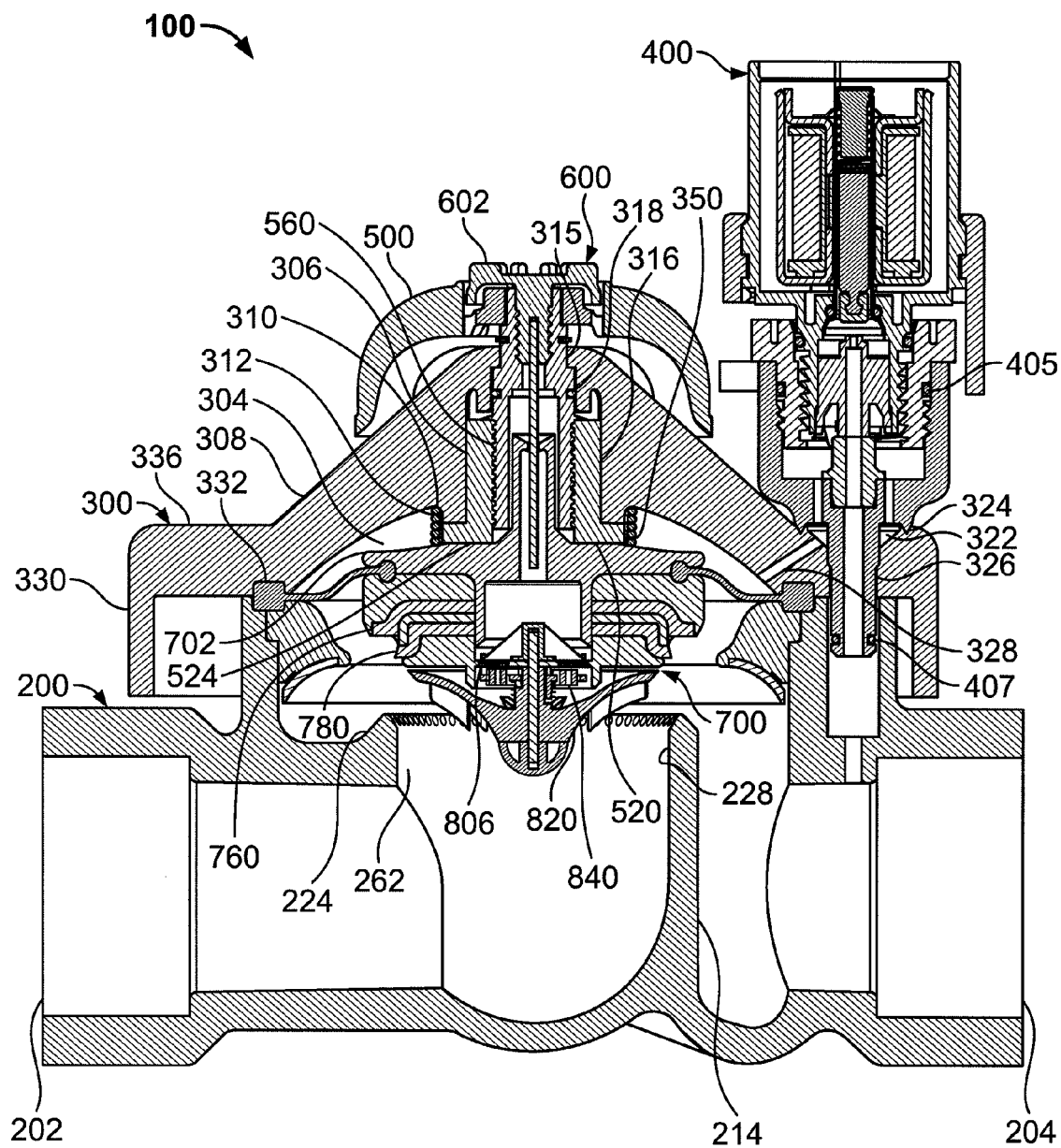
FIG. 5 is a section view of the diaphragm valve of FIG. 1 similar to that of FIG. 4 but showing the diaphragm valve in its open stage with a stop at its minimum.
Figure 14:
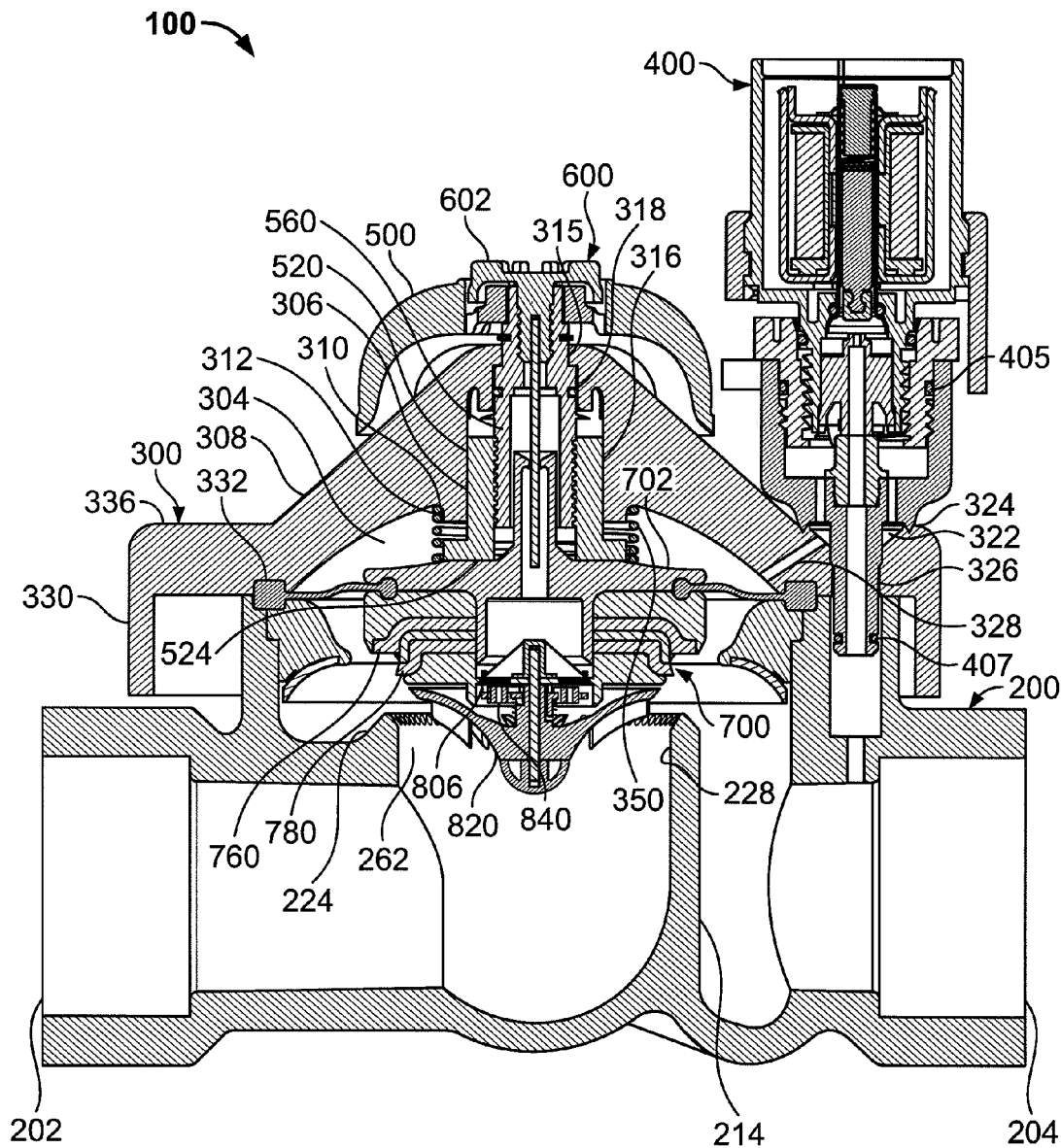
FIG. 14 is a section view of the diaphragm valve of FIG. 1 similar to that of FIG. 4 showing the diaphragm valve in its fully open stage with the stop at less than the minimum.

The flow-control assembly 540 includes a translatable stop member 520, a rotatable drive cylinder 560 and the flow-control handle 500. The flow-control handle 500 is positioned on the outside of the bonnet 300, on a side of the bonnet 300 opposite the control chamber 304 formed between the bonnet 300 and the diaphragm assembly 700. The stop member 520 is positioned in a large diameter opening 316 in the dome-shaped portion 308 of the bonnet 300. The drive cylinder 560 is partially positioned in an internal bore 522 of the stop member 520 and extends through an intermediate diameter opening 318 and a small diameter opening 315 in the dome-shaped portion 308 of the bonnet 300 and to the outer surface of the bonnet 300. Rotation of the flow-control handle 500 causes rotation of the drive cylinder 560 but not movement along its axis. Rotation of the drive cylinder 560 causes the stop member 520 to translate along its axis but not to rotate relative to the bonnet 300. In this manner, rotation of the flow-control handle 500 selectively adjusts the position of the stop member 520, and in particular the position of a stop surface 524 of the stop member 520 in the control chamber 304. When the diaphragm assembly 700 abuts the stop surface 524, the assembly 700 is in its maximum open position. Thus, by adjusting the position of the stop surface 524 using the flow-control handle 500, the maximum open position of the diaphragm assembly 700, and therefore the maximum spacing and flow area between the first and second seals 760 and 780 and the diaphragm valve seat 224, can controlled. For example, the stop surface 524 can be placed closer to the valve body 200, as illustrated in FIG. 14, or further from the valve body 200, as illustrated in FIG. 5.

The stop member 520 is generally cylindrical, and has a plurality of radially projecting and longitudinally extending locking ribs 526 on its outer surface. The locking ribs 526 of the stop member 520 are configured to mate with locking grooves (not shown) formed in the large diameter opening 316 of the dome-shaped portion 308 of the bonnet 300. The locking ribs 526 of the stop member 520 and the locking grooves of the bonnet 300 interface to prevent rotation of the stop member 520 relative to the bonnet 300. A radial flange 528 extends outward from the bottom end of the stop member 520, and has the stop surface 524 facing the control chamber 304. The radial flange 528 also limits retraction, i.e., translation away from the valve body 200 and the control chamber 304, relative to the bonnet 300 by abutting the undersurface of the dome-shaped portion 308 of the bonnet 300 when fully retracted to prevent further retraction.

As mentioned above, the drive cylinder 560 is partially positioned in the internal bore 522 of the stop member 520 and extends through an intermediate diameter opening 318 and a small diameter opening 315 in the dome-shaped portion 308 of the bonnet 300 and to the outer surface of the bonnet 300. To this end, the drive cylinder 560 includes three segments, a larger diameter segment 562 received in the internal bore 522 of the stop member 520, a medium diameter segment 566 received in the intermediate diameter portion 318 of the opening 306 of the bonnet 300, and a smaller diameter segment 568 received in the smaller diameter portion 315 of the opening 306 of the bonnet 300. An intermeshing end 570 of the drive cylinder 560 extends through the opening 306 of the bonnet 300. The intermeshing end 570 has a square cross-section that mates with an opening 504 of the flow-control handle 500 that has a corresponding square cross-section so that rotation of the flow-control handle 500 causes the drive cylinder 520 to rotate. An annular groove 578 is positioned on the intermediate diameter segment 560 of the drive cylinder 520 and contains an o-ring 580 that engages the intermediate diameter portion 318 of the opening 306 of the bonnet 300 to reduce, and ideally prevent, leakage of fluid therepast. The smaller diameter segment 568 also includes an annular groove 576. However, the annular groove 576 on the smaller diameter segment 568 is configured to receive a snap ring 574. The snap ring 574 has a diameter such that, when it is positioned between the exterior surface of the bonnet 300 and the undersurface 502 of the flow-control handle 500, it prevents the drive cylinder 560 from translating inward through the opening 306 of the bonnet 300, and thereby assists in maintaining the drive cylinder 560 in positioned relative to the bonnet 300.

The drive cylinder 560 includes external threads 564 on its larger diameter segment 562 that mate with internal threads 523 formed on the internal bore 522 of the stop member 520. When the flow-control handle 500 is rotated it drives the drive cylinder 560 for rotation as well. However, the snap ring 574 prevents the drive cylinder 560 from translating either into or out of the opening 306 in the bonnet 300. Instead, the rotation of the drive cylinder 560 causes the stop member 520 to translate due to the engagement between the external threads 564 on the drive cylinder 560 and the internal threads 523 on the stop member 520. The thread to thread engagement between the stop member 520 and the drive cylinder 560 would typically cause the stop member 520 to rotate. Such rotation is prevented, though, due to the engagement between the locking ribs 526 of the stop member 520 and the ribs 312 in the larger diameter portion 316 of the opening 306 of the bonnet 300. Thus, rotation of the flow-control handle 500 causes the stop member 520 to translate either further into or away from the control chamber 304, and thereby permits selective positioning of the stop surface 524 of the stop member 520 to selectively control the flow area between the first and second seals 760 and 780 and the diaphragm valve seat 224 to control the flow rate of fluid through the diaphragm valve 100. Gaps (not shown) between the ribs 312 of the bonnet 300 are sized to accommodate the locking ribs 526 of the stop member 520. The gaps may be sized larger than necessary to accommodate the locking ribs 526 in order to permit fluid flow between the gaps and the locking ribs 526, which can reduce stress in the bonnet 300, and may have rounded portions to reduce stress concentrations. This can advantageously result in reduced structural requirements of the bonnet 300, which can in turn reduce the costs of the bonnet 300.

The bleed assembly 600 permits for pressurized fluid to be bled from the control chamber 304 and vented to the atmosphere. Unlike typical prior bleed assemblies, the presently disclosed bleed assembly 600 is configured to both direct the pressurized fluid escaping from the control chamber 304 away from a user while also providing for a substantial reduction in the velocity of fluid escaping the chamber 304 in order to reduce spray. In addition, the bleed assembly 600 is configured to facilitate flushing of debris from both the flow path between the inlet and outlet 202 and 204 and the flow path between the inlet 202 and the control chamber 304.

The bleed assembly 600 includes the bleed screw 602 which is rotated to open and close the flow path from the control chamber 304 to the atmosphere. The bleed assembly 600 also includes the flow path from the control chamber 304 to the atmosphere, which in turn includes the internal bore 522 of the stop member 520, an internal bore 582 disposed in the larger diameter segment 562 of the drive cylinder 560, an aligned internal bore 584 extending through both the intermediate diameter segment 566 and the smaller diameter segment 568 of the drive cylinder 560, and an internally threaded bore 572 extending though the intermeshing end 570 of the drive cylinder 560.

Figure 15:
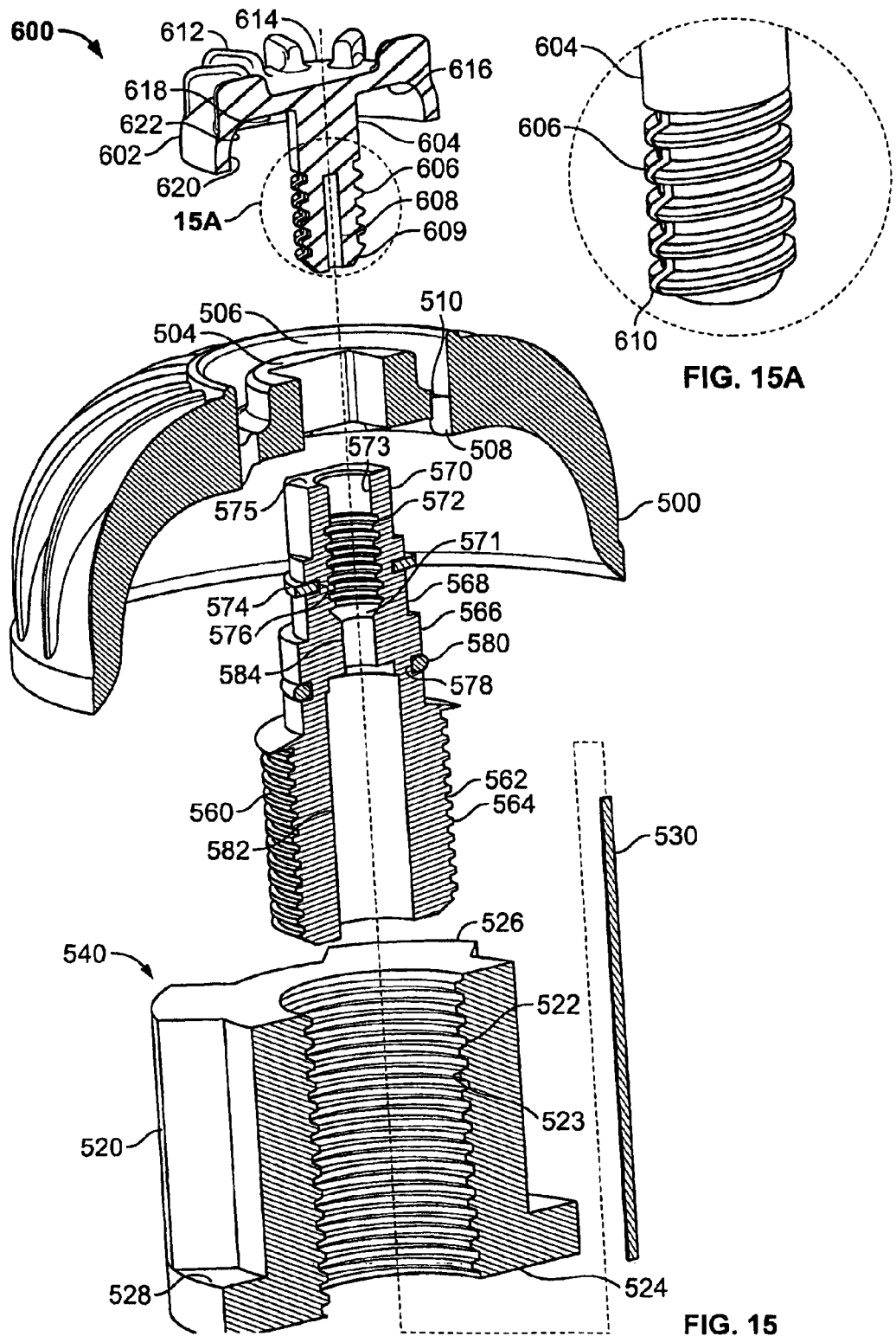
FIG. 15 is an exploded section view of a bleed screw and stop assembly of the diaphragm valve of FIG. 1.
Figure 16:
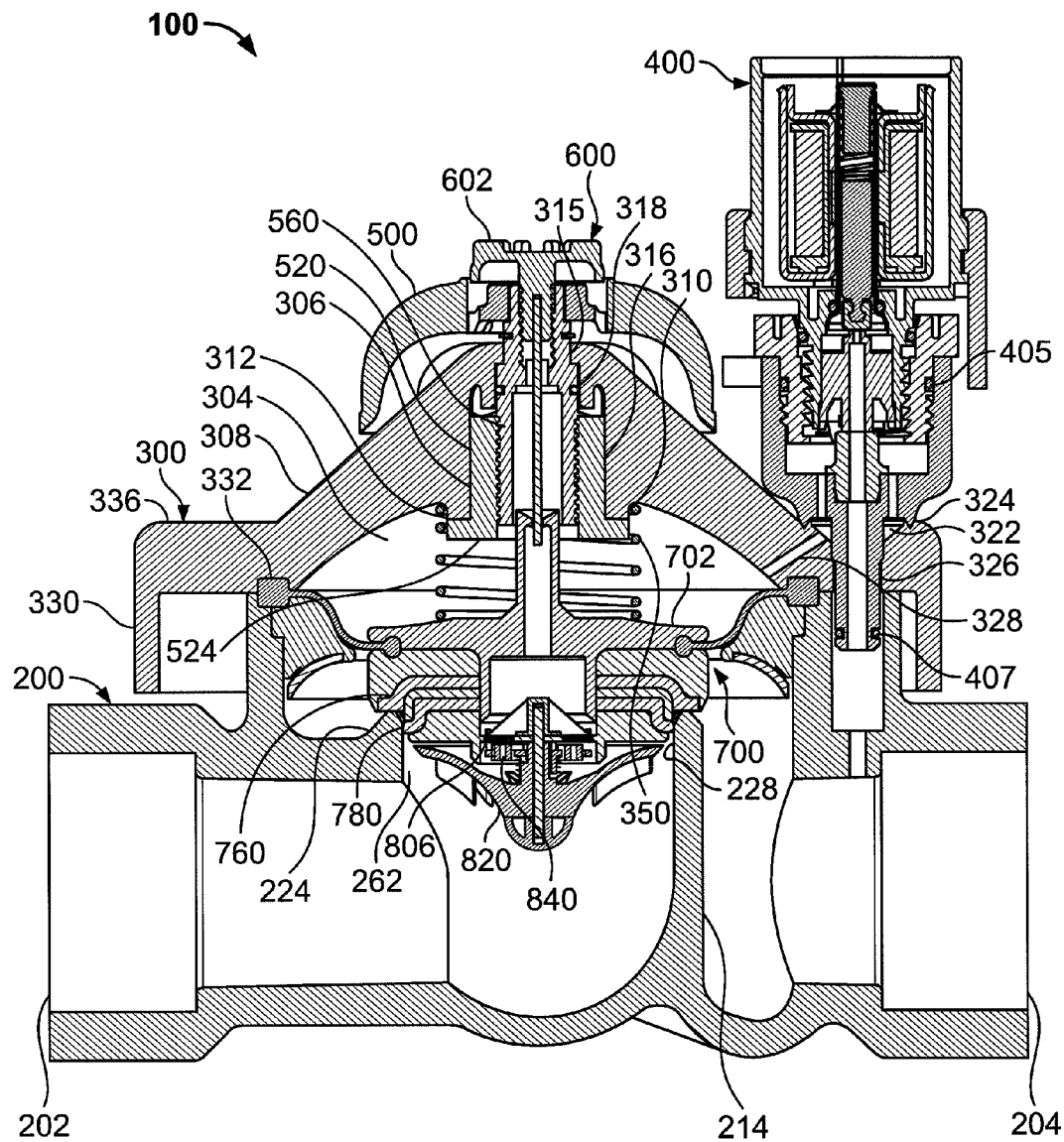
FIG. 16 is a section view of the diaphragm valve of FIG. 1 similar to that of FIG. 4 showing the diaphragm valve in its fully closed stage with the bleed screw opened.

The bleed screw 602 has a head 614 with a depending shank 604. The distal end of the shank 604, opposite the head 614, includes a threaded region 606 that is configured to threadingly engage the internally threaded bore 572 of the drive cylinder 560, as illustrated in FIG. 15. The threaded region 606 of the shank 604 of the bleed screw 602 includes at least one longitudinally extending, external flow channel 610, as illustrated in FIG. 15A. The threaded region 606 terminates in conical surface 609, opposite the head 614, which, when the bleed screw 602 is in a closed position, mates with a conical surface 571 in the bore 584 of the drive cylinder 560 to prevent fluid flow escaping through the flow path, including through the flow channel 610 formed on the shank 604. However, when the bleed screw 502 is rotated to an open position, spacing the conical surface 609 of the bleed screw 602 from the conical surface 571 of the drive cylinder 560, fluid is permitted to flow from the control chamber 304, through the internal bore 522 of the stop member 520, through the bores 582 and 584 of the drive cylinder 560, through the flow channel 610 formed the shank 604 of the bleed screw 602 and between the shank 604 and an outer surface 573 of the intermeshing end 570 of the drive cylinder 560. The vertical flow is then turned horizontal by an underside 616 of the bleed screw 602. The passage upper-bounded by a radially outward segment 618 of bleed screw 602 and lower-bounded by first a top surface 575 of drive cylinder 560 and then a top surface 505 of flow-control handle 500 forms a radial diffuser. That is, flow emerging at or near the center, as in this case around the shank 604 of bleed screw 602, entering at a given velocity will experience a significant reduction in velocity by the time it exits the radial diffuser. This is due to the fact that the velocity at the radial diffuser exit is reduced by the factor obtained by dividing the square of the radius at which the flow entered by the square of the radius at which the flow leaves the radial diffuser. Upstanding ribs 612 are provided on the head 614 of the bleed screw 602, opposite the underside 616, to facilitate rotation of the bleed screw 602 by a user.

The reduced-velocity fluid exiting the diffuser portion of the bleed assembly, is then directed downward into a circumferential groove 506 in flow-control handle 500 by first the arcuate surface 622 and then by the downward surface 620 of bleed screw 602. The fluid then drains from groove 506 through a plurality of drain holes 508 in flow-control handle 500 and flows harmlessly down upper surface 308 of the bonnet 300. Thus, the bleed screw 602 both diffuses the escaping fluid flow from the control chamber 304 and redirects the escaping fluid to reduce spray undesirable to the user.

When the bleed screw 602 is in its open position, the pressure in the control chamber 304 is reduced, which causes the diaphragm assembly 700 to shift to its maximum open position. This can advantageously facilitate flushing of debris from the flow path between the inlet and outlet 202 and 204, including any debris that may accumulate on the diaphragm valve seat 224 and the seals 760 and 780. If the flow-control stop member 520 is at its minimum spacing from the bonnet 300, the diaphragm assembly 700 can be at its maximum spacing possible from the diaphragm valve seat 224, which can further facilitate flushing of debris.

The bleed screw 602 includes a blind internal bore 608 that is configured to frictionally receive a depending centering shaft 530. The shaft 530 has a length sufficient to extend through the orifice 704 and into the bore 710 of the top plate 702. The shaft 530 functions with the orifice 704 to provide a control-chamber-feed annulus of predetermined area in order to assure that the diaphragm valve 100 opens when the solenoid valve 400 is actuated. The area of the annulus also determines the rate at which the valve 100 closes once the solenoid valve 400 is closed. In order to facilitate flushing of debris that may accumulate and at least partially block the orifice 704, the centering shaft 530 can be removed from the orifice 704 upon rotation of the bleed screw 602 to its open position. This will increase the flow area and permit debris to pass through the orifice 704.

Opening and closing the diaphragm valve 100 is performed by unblocking and blocking the control chamber exit path that vents fluid from the control chamber 304. Assuming the valve 100 starts in a closed condition, when an electrical current is sent to the solenoid valve 400, the solenoid valve 400 actuates and permits fluid flow between the control chamber 304 and the outlet opening 204 of the valve body 200, thus venting the control chamber 304 to the pressure of the outlet opening 204. Because when electrical current is first started, there is only atmospheric pressure at the outlet opening 204, the pressure in the control chamber 304 pressure drops to near atmospheric. At that point, the generally much higher fluid-supply pressure acting on the bottom of the diaphragm assembly 700 through the inlet opening 202 of the valve body 200 urges the diaphragm assembly 700 off the diaphragm valve seat 224, thus allowing fluid flow through the opening 262 and to the outlet 204. A typical irrigation system is generally at atmospheric pressure when the electrical current is sent to the solenoid valve 400. At that time, the pressure in the control chamber 304 does not exert sufficient resistance as compared to the incoming fluid acting on the other side of the diaphragm assembly 700. As a result, the diaphragm assembly 700 may rise to the mechanical limit set by the flow-control stop member 520.

However, once the irrigation system fills and pressurizes, the difference in pressure between the inlet 202 and outlet 204 of the diaphragm valve 100 can be limited to the valve characteristic pressure drop at the flowrate allowed by the irrigation system. At that point, the higher pressure at the outlet 204 will, because of the fluid connection between the outlet 204 and the control chamber 304 through the control chamber exit path, increase the pressure in the control chamber 304. The increased pressure can drive the diaphragm assembly 700 downward toward the diaphragm valve seat 224 until a balance is achieved between the force exerted on the bottom of the diaphragm assembly 700 by the fluid flowing through the valve 100 and that acting on the top of the diaphragm assembly 700 by the fluid in the control chamber 304. The valve 100 will stabilize in this equilibrium position until the electrical current to the solenoid valve 400 is interrupted to allow the valve 100 to close.

When the electrical current to the solenoid valve 400 ceases, the solenoid valve 400 closes and blocks fluid flow from the control chamber 304 to the outlet 204. High-pressure fluid upstream of the diaphragm assembly 700 is still feeding high pressure fluid into the control chamber 304 through the control chamber inlet path. Because there is nowhere for the high-pressure fluid to go, pressure in the control chamber 304 rises to nearly the high incoming line pressure. Due to the increased area on the diaphragm assembly 700 facing the control chamber as compared to on an opposite side thereof, the force is no longer in equilibrium and the diaphragm assembly 700 descends until it abuts against the diaphragm valve seat 224 to block fluid flow between the inlet 202 and outlet 204 of the valve 100.

Figure 4:
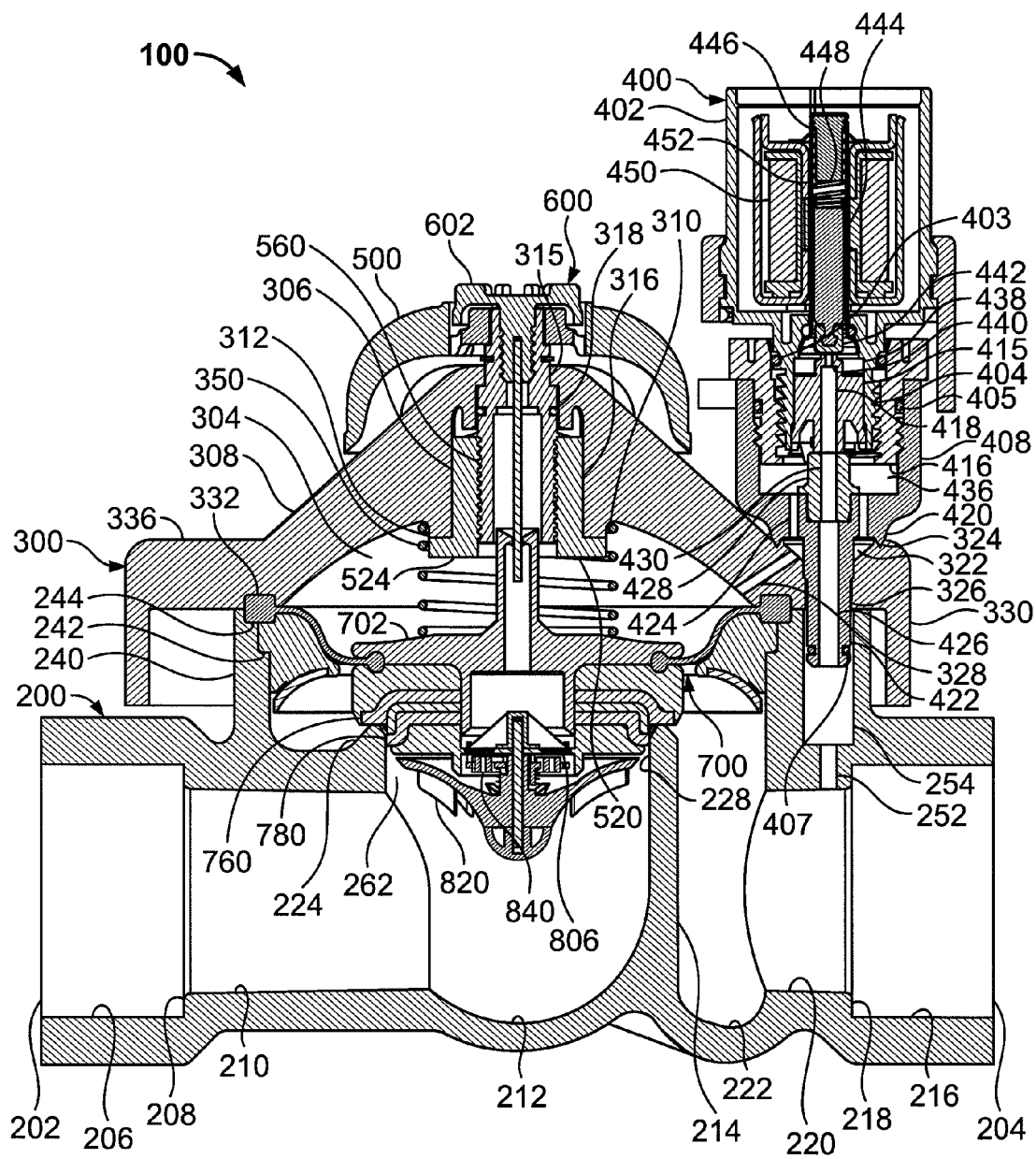
FIG. 4 is a section view of the diaphragm valve of FIG. 1 taken along line 4-4 of FIG. 3 and showing the diaphragm valve in its final sealing stage.

Turning now to the details of the solenoid valve 400, and with specific reference to FIG. 4, a solenoid housing 402 is joined to a solenoid mount 420 via an intermediate sleeve 416. More specifically, the lower end of the solenoid housing 402 includes a cylindrical stem 404 having external threading 406 engageable with internal threading 410 of the intermediate sleeve 416. The solenoid housing 402 is sealed to the intermediate sleeve 416 by an o-ring 403. The intermediate sleeve 416 also has external threading engageable with internal threading of an upper bowl 408 of the solenoid mount 420. The intermediate sleeve 416 is sealed to the upper bowl 408 by an o-ring 405. The solenoid mount 420 also includes a lower stem 422 sized to pass through a solenoid aperture 326 of the bonnet 300 and into a cylindrical bore 254 of the valve body 200. The lower stem 422 is sealed to the cylindrical bore 254 by an o-ring 407.

The plunger sleeve 452 has a closed end and an open end extending into the cylindrical stem 404. A magnetizable core 446 is disposed adjacent the closed end of the plunger sleeve 452, and is spaced by a compression spring 448 from a magnetizable plunger 444. The tip of the plunger 444, opposite the spring 448, has an attached plunger cap 442 for sealing an orifice 440 of a plunger retainer 415 to selectively prevent fluid from flowing through a bore 418 of the plunger retainer 415.

The solenoid housing 402 encloses a winding 450 surrounding a portion of a plunger sleeve 452. When electrical current is passed through the winding 450, the plunger 444 is drawn within the plunger sleeve 452 toward the core 446 at the closed end of the plunger sleeve 452 against the biasing force of the spring 448 to withdraw the plunger cap 442 from sealing the orifice 440 of the plunger retainer 415 to permit fluid to drain from the secondary chamber 438, through the orifice 440 and bore 418 of the plunger retainer 415, through the bore 430 of a solenoid seal 428, through the bore 426 of the stem 422 of the solenoid housing 402, through the large bore 254 and small bore 252 of the valve body 200, and finally into the outlet passage 204. Conversely, when electrical current is not passed through the winding 450, the spring 448 biases the plunger 444 outward from the plunger sleeve 452, causing the plunger cap 442 attached thereto to seal the orifice 440 of the plunger retainer 415 and prevent fluid from draining from the secondary chamber 438, which in turn prevents fluid from draining from the control chamber 304.

The fluid path from the control chamber 304 to the outlet passage and the outlet opening 204 includes a fluid passage 328 through the dome-shaped portion 308 of the bonnet 300 and into a bowl 322 formed between the underside of the solenoid housing 402 and the flange 320 of the bonnet 300, as illustrated in FIG. 4. From the bowl 322, fluid flows into an intermediate chamber 436 via a plurality of fluid passages 424 in the bottom of the solenoid mount 420. From the intermediate chamber 436, the fluid flows to the upper chamber 438 in passages between the intermediate solenoid member 415 and the stem 404 of the solenoid housing 402. Once in the upper chamber 438, the fluid can exit only when the plunger cap 442 is spaced from orifice 440 of the intermediate element 416.

When the cap 442 is blocking the orifice 440, fluid flow from the control chamber 304 is blocked and the forces acting on the control-chamber side of the center stem assembly 700 are greater than the forces acting on its upstream side. This causes the first and second seals 760 and 780 to engage the diaphragm valve seat 224 and block fluid flow through the opening 762 of the diaphragm valve seat 224. This corresponds to the closed position of the diaphragm valve 100.

Conversely, when solenoid winding 450 is energized to cause the plunger 444 to be drawn toward the core 446 to draw the plunger cap 442 from the orifice 440, fluid is permitted to drain from the control chamber 304. When fluid is drained from the control chamber 304, the forces acting on the control chamber side of the center stem assembly 700 are no longer greater than the forces acting on the opposite side, which results in the assembly 700 shifting toward the bonnet 300 and the first and second seals 760 and 780 being spaced from the diaphragm valve seat 224 to permit fluid flow through the opening 262 thereof. More specifically, fluid drains from the control chamber 304, through the passage 328, into the bowl 322, through the fluid passages 424 and into the intermediate chamber 436, along the passages between the plunger retainer 415 and the stem 404 and into the upper chamber 438, through the orifice 440 and bore 418 of the plunger retainer 415, through the bore 430 of the solenoid seal 428, through the bore 426 of the stem 422 of the solenoid mount 420, through the large bore 254 and small bore 252 of the valve body 200, and finally into the outlet passage 204.

The drawings and the foregoing descriptions are not intended to represent the only forms of the diaphragm valve 100 in regard to the details of construction and manner of operation. Changes in form and in the proportion of parts, as well as the substitution of equivalents, are contemplated as circumstances may suggest or render expedient; and although specific terms have been employed, they are intended in a generic and descriptive sense only and not for the purposes of limitation. For example, although the foregoing benefits may each be achieved in the presently-disclosed diaphragm valve 100, other diaphragm valves may be configured to incorporate less than all of the configurations that result in these benefits.

The invention claimed is:

1. A diaphragm valve comprising:
 a valve body having an inlet passage and an outlet passage;
 a diaphragm positioned between the inlet passage and the outlet passage, the diaphragm having a closed position where fluid flow from the inlet passage to the outlet passage is blocked and an open position where fluid flow from the inlet passage to the outlet passage is permitted;
 a control chamber disposed on one side of the diaphragm;
 a control chamber entrance passage extending from the inlet passage of the valve body to the control chamber to permit fluid to flow from the inlet passage of the valve body into the control chamber;
 a control chamber exit passage extending from the control chamber to permit fluid flow from the control chamber;
 a valve positioned to selectively permit fluid flow through the control chamber exit passage from the control chamber to the outlet passage of the valve body to control the fluid pressure in the control chamber;
 a screen positioned to restrict debris from passing through the inlet passage to the control chamber;
 a scrubber rotatable relative to the screen to remove debris from the screen; and
 a brake associated with the scrubber and configured for limiting the acceleration of the scrubber at or above certain speeds in order to reduce the potential for harm due to friction between the scrubber and the screen.

2. The diaphragm valve of claim 1 further comprising a turbine in the inlet passage of the valve body to rotatably drive the scrubber when fluid is flowing though the inlet passage.

3. The diaphragm valve of claim 2 further comprising a shaft fixed relative to the screen and the scrubber and turbine being rotatable about the shaft.

4. The diaphragm valve of claim 1 wherein:
the valve body includes a bonnet;
the control chamber being bounded at least in part by the bonnet and by the diaphragm;
a stop provided in the control chamber to limit the extent of the open position of the diaphragm; and
a rotatable handle disposed outside the bonnet from the control chamber, rotation of the handle causing adjustment of the position of the stop.

5. A diaphragm valve comprising:
a valve body having an inlet passage and an outlet passage;
a diaphragm assembly positioned between the inlet passage and the outlet passage, the diaphragm valve assembly having a central seal assembly and a flexible membrane, the membrane having an outer portion fixed relative to the valve body and another portion fixed to the seal assembly, and the seal assembly having a first seal and a second seal, the first seal being positioned between the flexible membrane and the second seal and having a greater radial reach than the second seal;
an annular seat for the diaphragm valve assembly, the seat having a first surface portion for engagement with the second seal, a second surface portion for engagement with the first seal and a central fluid passage;
a control chamber disposed on a control side of the diaphragm valve assembly;
a control chamber entrance passage extending from the inlet passage to the control chamber to permit flow from the inlet passage into the control chamber;
a screen positioned to restrict debris from passing through the inlet passage to the control chamber;
a scrubber rotatable relative to the screen to remove debris from the screen;
a brake associated with the scrubber and configured for limiting the acceleration of the scrubber at or above certain speeds in order to reduce the potential for harm due to friction between the scrubber and the screen;
a control chamber exit passage extending from the control chamber to permit flow from the control chamber;
a valve to selectively permit flow through the control chamber exit passage;
an open stage of the diaphragm valve member where the first and second seals are spaced from the seat to permit flow through the central fluid passage and between the inlet passage and outlet passage when forces due to fluid pressure in the control chamber acting on the control side of the diaphragm valve assembly are less than forces due to fluid pressure in the inlet passage acting on the opposite side of the diaphragm valve assembly;
an initial sealing stage of the diaphragm valve assembly where the first seal is spaced from the seat and the second seal is engaged with the seat to partially block flow through the central fluid passage and between the inlet passage and outlet passage; and
a final sealing stage of the diaphragm valve assembly where the first and second seals are engaged with the seat to block flow through the central fluid passage and between the inlet passage and outlet passage when forces due to fluid pressure in the control chamber acting on the control side of the diaphragm valve assembly are greater than forces acting on the opposite side of the diaphragm valve assembly.

6. The diaphragm valve of claim 5 wherein the first surface portion includes an inwardly inclined surface portion with a plurality of circumferentially spaced recesses, the recesses defining at least in part a flow path when the second seal is engaged with the inwardly inclined surface portion in the initial sealing stage of the diaphragm valve assembly to partially block flow through the central fluid passage and between the inlet passage and outlet passage while permitting fluid flow between the recesses and the second seal.

7. The diaphragm valve of claim 6 further comprising:
a turbine positioned within the inlet passage to rotatably drive the scrubber when fluid is flowing through the inlet passage; and
a shaft fixed relative to the screen and the scrubber and turbine being rotatable about the shaft.

8. The diaphragm valve of claim 6 wherein:
the valve body includes a bonnet;
the control chamber being bounded at least in part by the bonnet and by the diaphragm;
a stop provided in the control chamber to limit the extent of the open position of the diaphragm; and
a rotatable handle disposed outside the bonnet from the control chamber, rotation of the handle causing adjustment of the position of the stop.

9. A diaphragm valve comprising:
a valve body having an inlet passage and an outlet passage;
a diaphragm positioned between the inlet passage and the outlet passage, the diaphragm having a closed position where fluid flow from the inlet passage to the outlet passage is blocked and an open position where fluid flow from the inlet passage to the outlet passage is permitted;
a control chamber disposed on one side of the diaphragm;
a control chamber entrance passage extending from the inlet passage of the valve body to the control chamber to permit fluid to flow from the inlet passage of the valve body into the control chamber;
a control chamber exit passage extending from the control chamber to permit fluid flow from the control chamber;
a valve positioned to selectively permit fluid flow through the control chamber exit passage from the control chamber to the outlet passage of the valve body to control the fluid pressure in the control chamber;
a screen positioned to restrict debris from passing through the inlet passage to the control chamber;
a scrubber rotatable relative to the screen to remove debris from the screen, the scrubber having a hub and a plurality of arms extending outward from the hub, the arms being configured to shift radially outward to engage a portion of the diaphragm valve during rotation above certain speeds to limit rotational speed of the scrubber;
a turbine in the inlet passage of the valve body to rotatably drive the scrubber when fluid is flowing though the inlet passage; and
a shaft fixed relative to the screen and the scrubber and turbine being rotatable about the shaft.

10. The diaphragm valve of claim 9 wherein the screen is generally planar and the scrubber is generally planer and parallel to the screen, further comprising a seat for the scrubber, the seat having a rim that is the portion of the diaphragm valve engaged by the arms during rotation above certain speeds to limit rotational speed of the scrubber.

11. The diaphragm valve of claim 9 wherein the scrubber includes a plurality of nubs extending from the arms toward the screen.

12. The diaphragm valve of claim 9 wherein the arms have enlarged masses located generally opposite the hub and being sized to facilitate shifting of the arms radially outward during rotation above certain speeds.

13. The diaphragm valve of claim 9 further comprising a spring between the turbine and the scrubber to bias the scrubber against the screen.

* * * * *